(12) United States Patent
Hasegawa et al.

(10) Patent No.: US 12,250,484 B2
(45) Date of Patent: Mar. 11, 2025

(54) PHOTODETECTION DEVICE AND ELECTRONIC APPARATUS

(71) Applicant: SONY SEMICONDUCTOR SOLUTIONS CORPORATION, Kanagawa (JP)

(72) Inventors: Masako Hasegawa, Kanagawa (JP); Parit Kanjanavirojkul, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 137 days.

(21) Appl. No.: 18/003,338

(22) PCT Filed: Jun. 7, 2021

(86) PCT No.: PCT/JP2021/021636
§ 371 (c)(1),
(2) Date: Dec. 26, 2022

(87) PCT Pub. No.: WO2022/004289
PCT Pub. Date: Jan. 6, 2022

(65) Prior Publication Data
US 2023/0254604 A1    Aug. 10, 2023

(30) Foreign Application Priority Data

Jul. 3, 2020  (JP) .................. 2020-115934

(51) Int. Cl.
*H04N 25/77* (2023.01)
*H04N 25/772* (2023.01)
(Continued)

(52) U.S. Cl.
CPC .......... *H04N 25/772* (2023.01); *H04N 25/78* (2023.01); *H04N 25/779* (2023.01)

(58) Field of Classification Search
CPC ..... H04N 25/772; H04N 25/78; H04N 25/779
See application file for complete search history.

(56) References Cited

U.S. PATENT DOCUMENTS

2020/0053308 A1*    2/2020 Niwa ................ H03M 1/56

FOREIGN PATENT DOCUMENTS

| JP | 2000-287137 A | 10/2000 |
|----|---------------|---------|
| WO | 2018/159343 A1 | 9/2018 |
| WO | 2019/150917 A1 | 8/2019 |

OTHER PUBLICATIONS

International Search Report and Written Opinion of PCT Application No. PCT/JP2021/021636, issued on Aug. 10, 2021, 08 pages of ISRWO.

* cited by examiner

*Primary Examiner* — Twyler L Haskins
*Assistant Examiner* — Fayez A Bhuiyan
(74) *Attorney, Agent, or Firm* — CHIP LAW GROUP

(57) ABSTRACT

A photodetection device of the present disclosure includes: multiple AD converters provided for respective pixel columns of multiple pixels and performing AD conversion on a pixel signal based on a second output signal, and including a comparison circuit, which includes a first-stage amplifier circuit outputting a first output signal corresponding to a comparison operation based on the pixel signal and a reference signal, and a second-stage amplifier circuit coupled to the first-stage amplifier circuit and outputting the second output signal corresponding to the first output signal; multiple clamp circuits provided for the comparison circuit of each of the AD converters, and each including a switch controlled on and off based on a clamp control signal, in which the clamp circuits selectively clamp a voltage of the second output signal by turning on the switch; and a control (Continued)

signal generator generating the clamp control signal for each of the clamp circuits.

15 Claims, 29 Drawing Sheets

(51) Int. Cl.
*H04N 25/78* (2023.01)
*H04N 25/779* (2023.01)

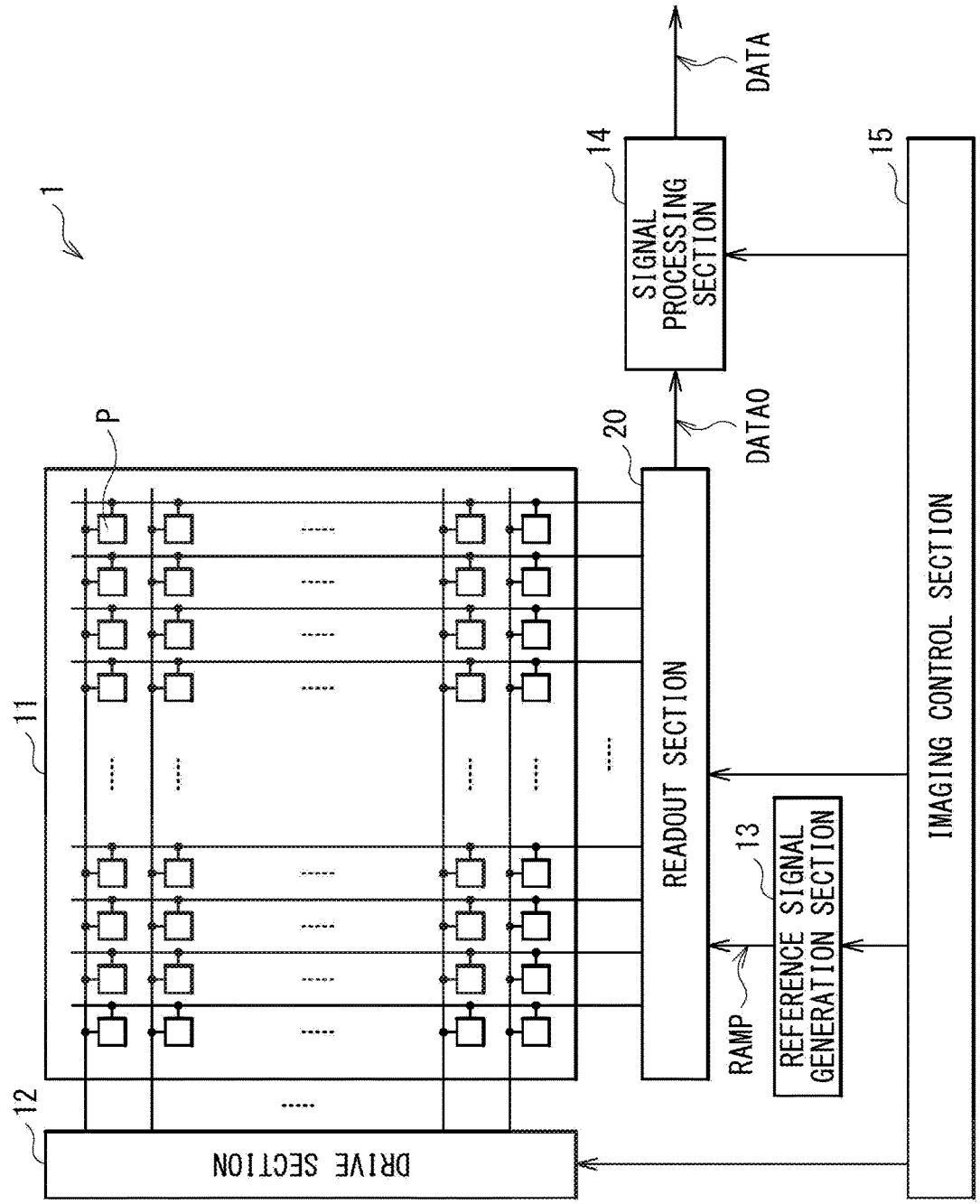
[FIG. 1]

[FIG. 2]
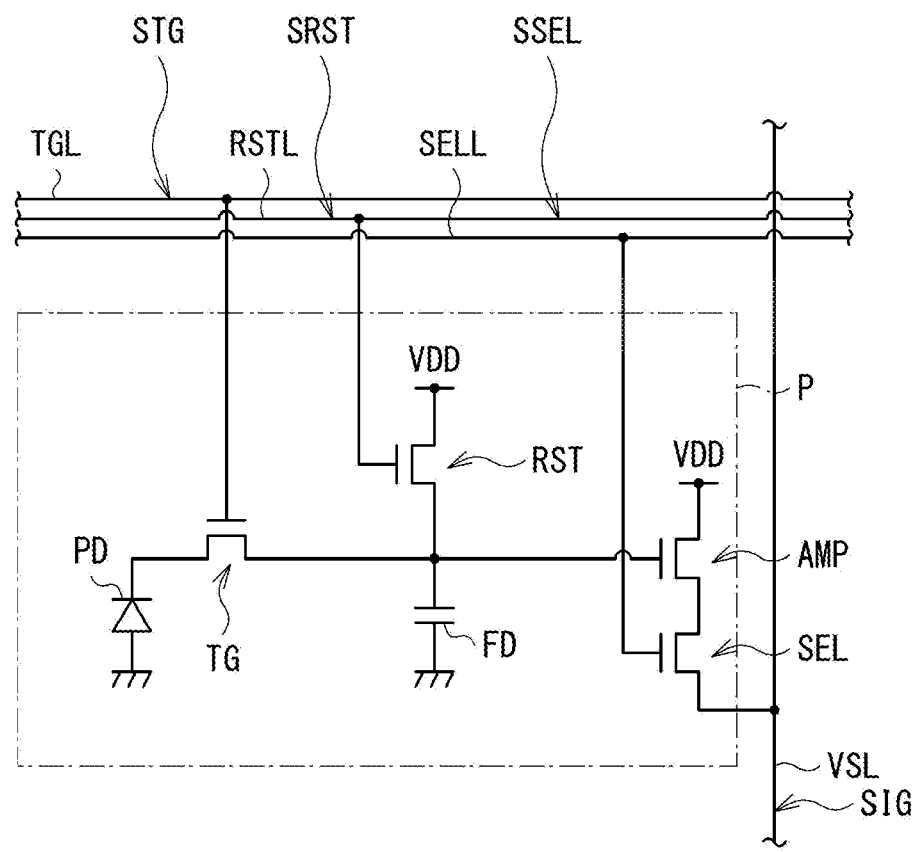

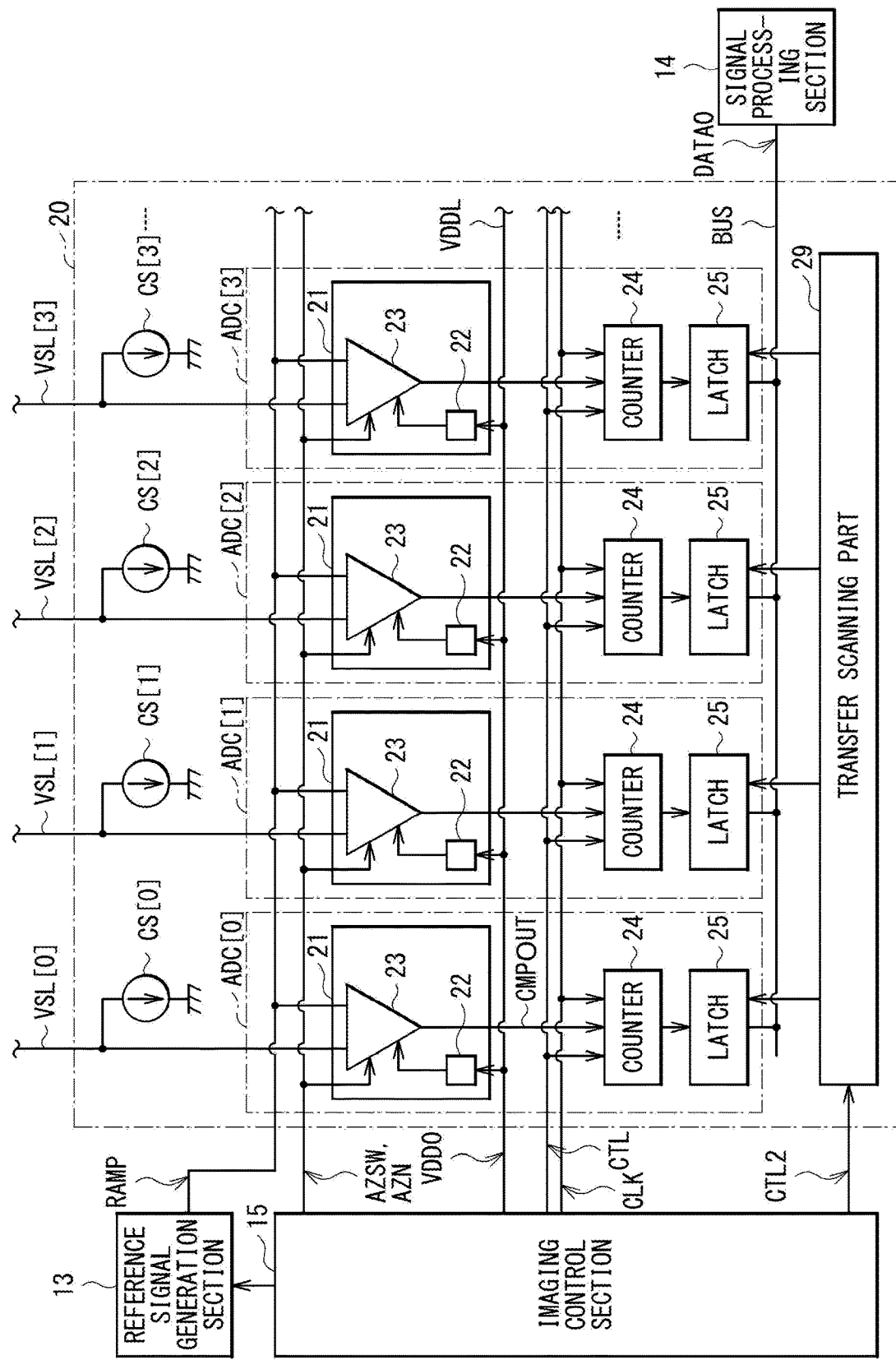

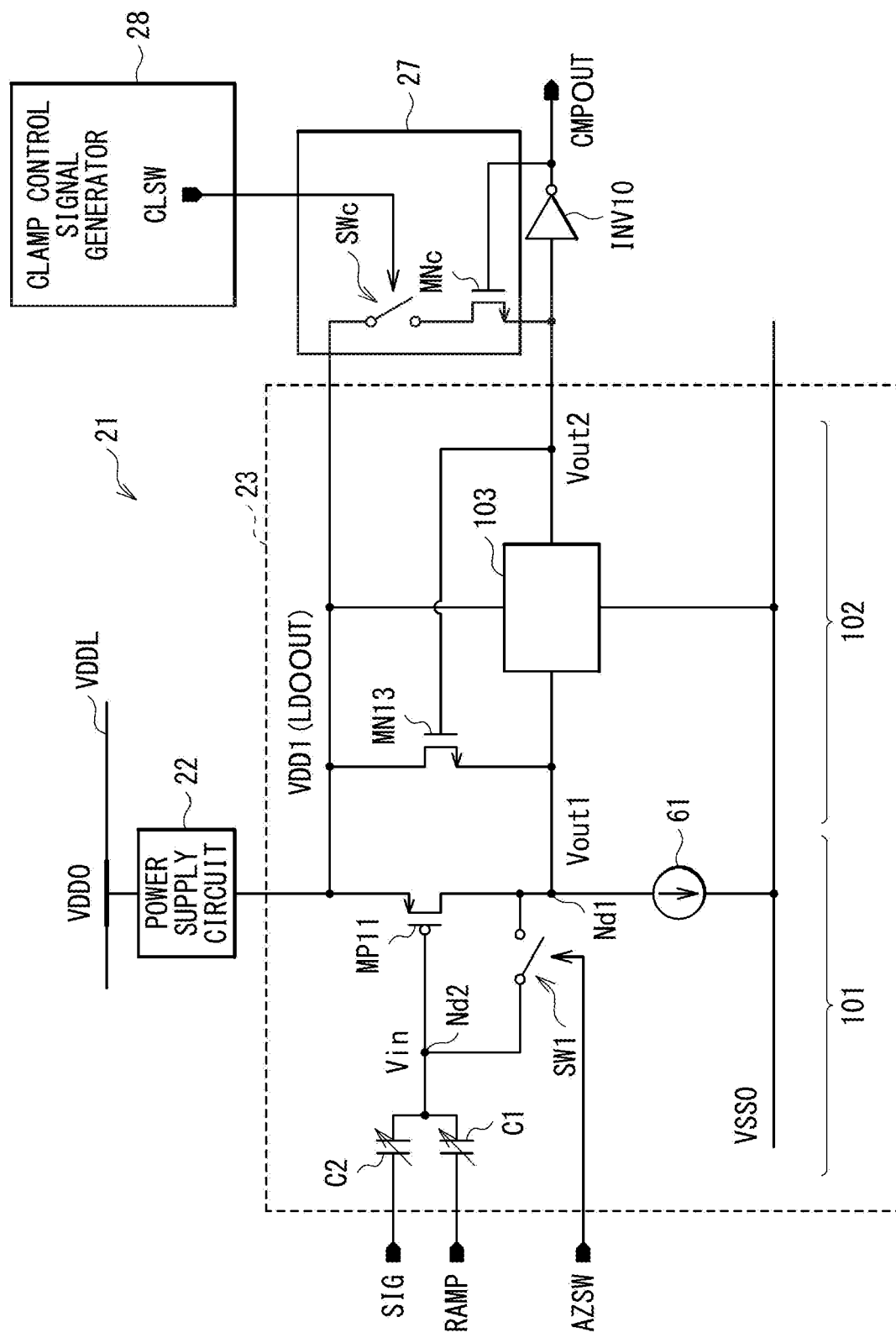
[FIG. 4A]

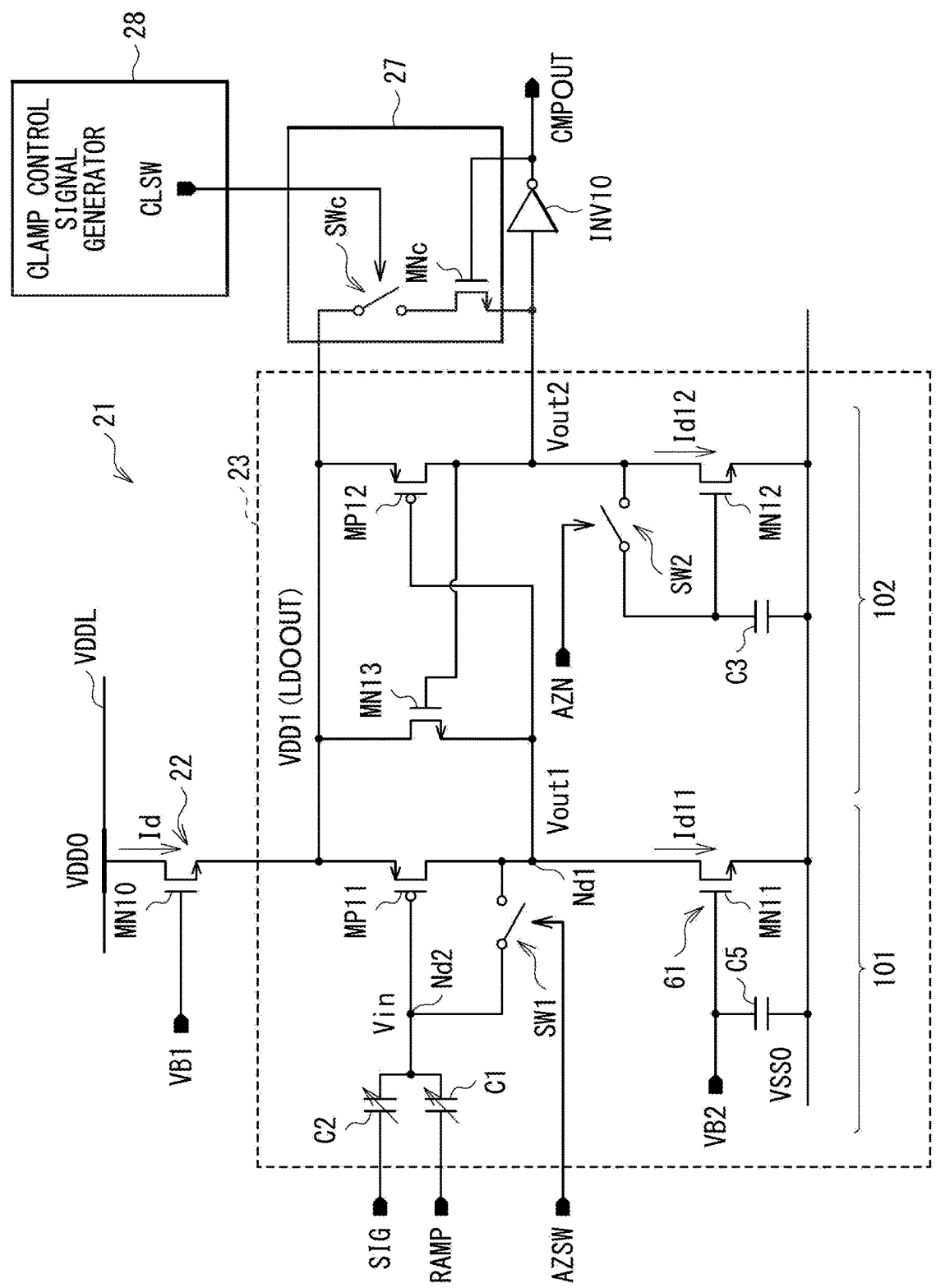
[FIG. 4B]

[FIG. 5]
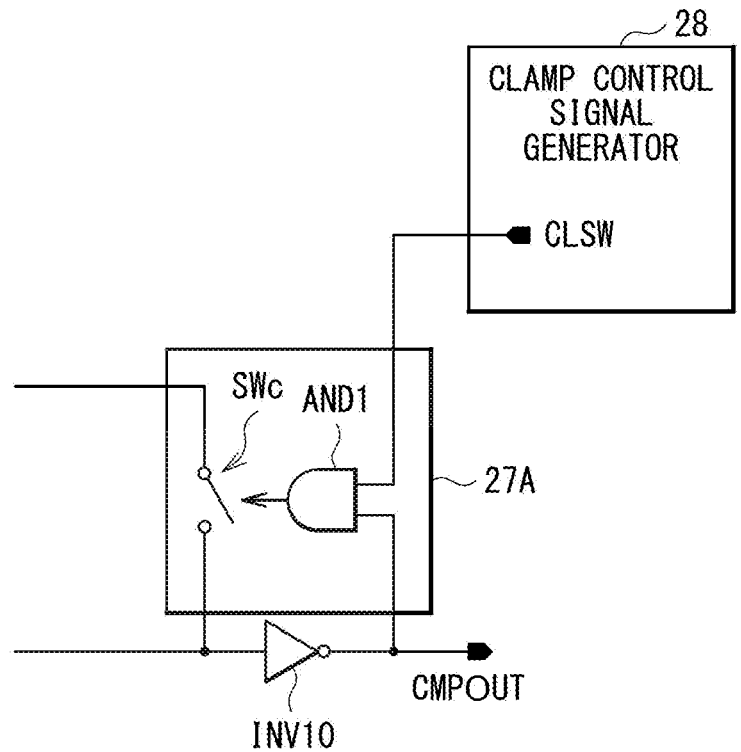
[FIG. 6]
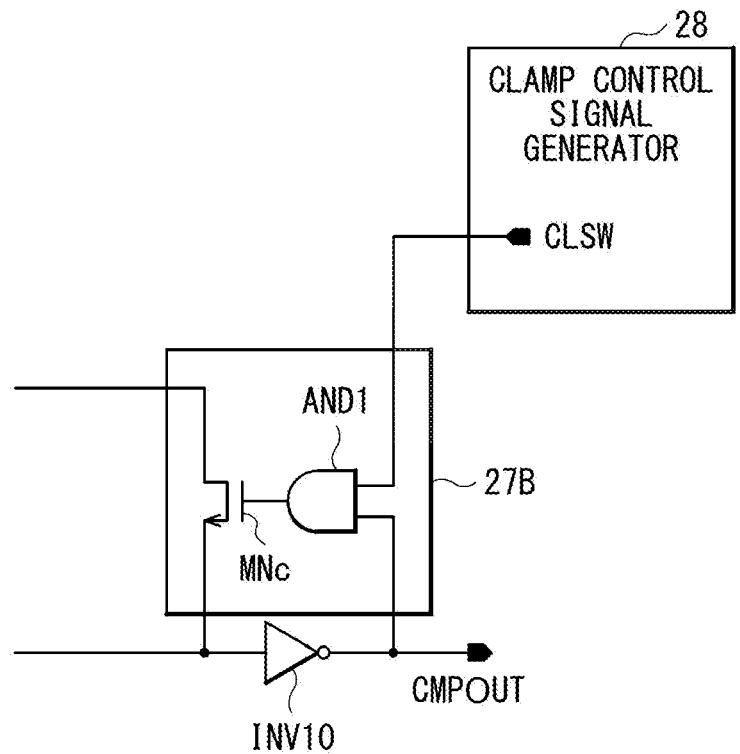

[FIG. 7]
| CLSW | CMPOUT | CLAMPING FUNCTION |
|---|---|---|
| 0 | 0 | OFF |
| 0 | 1 | OFF |
| 1 | 0 | OFF |
| 1 | 1 | ON |
[FIG. 8]

[FIG. 9]
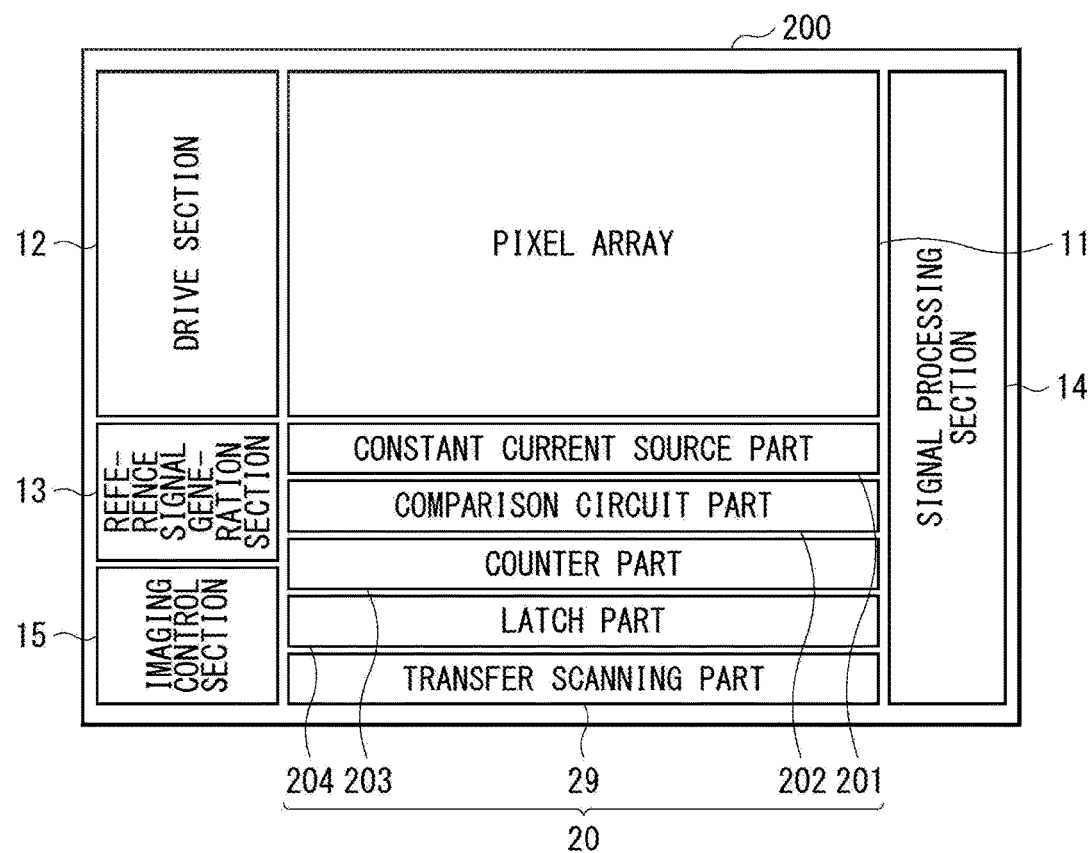

[FIG. 10]
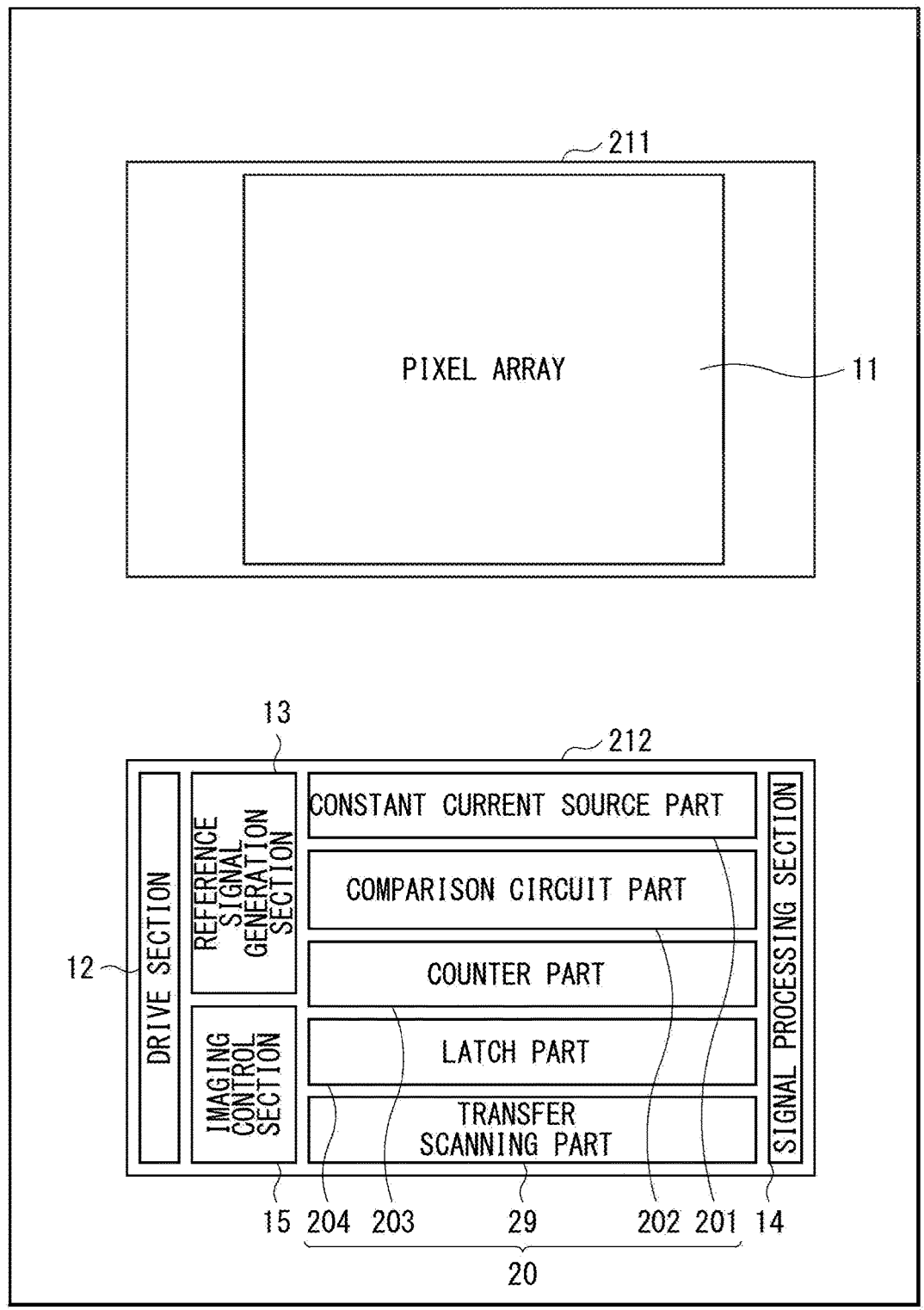

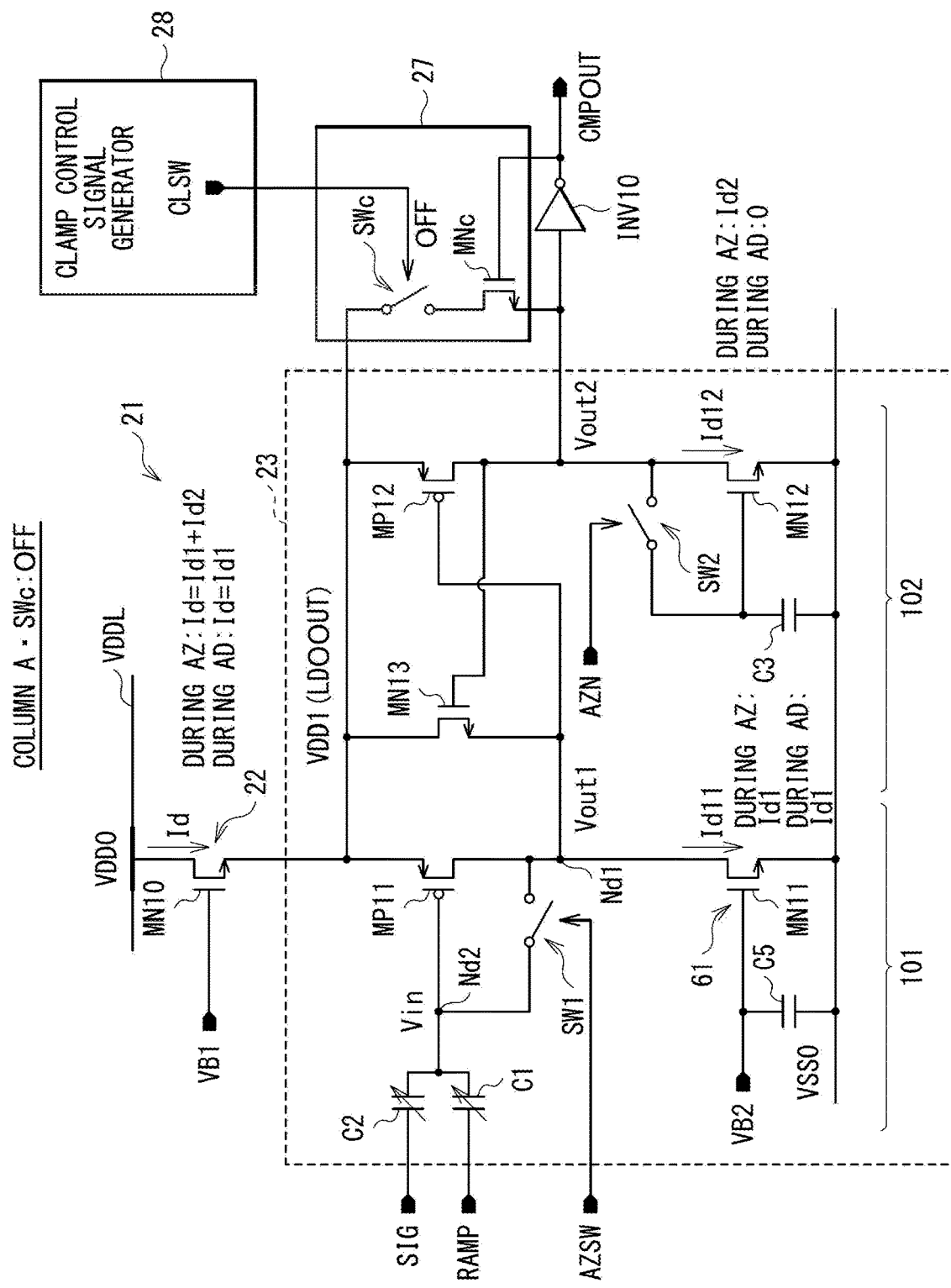
[FIG. 11]

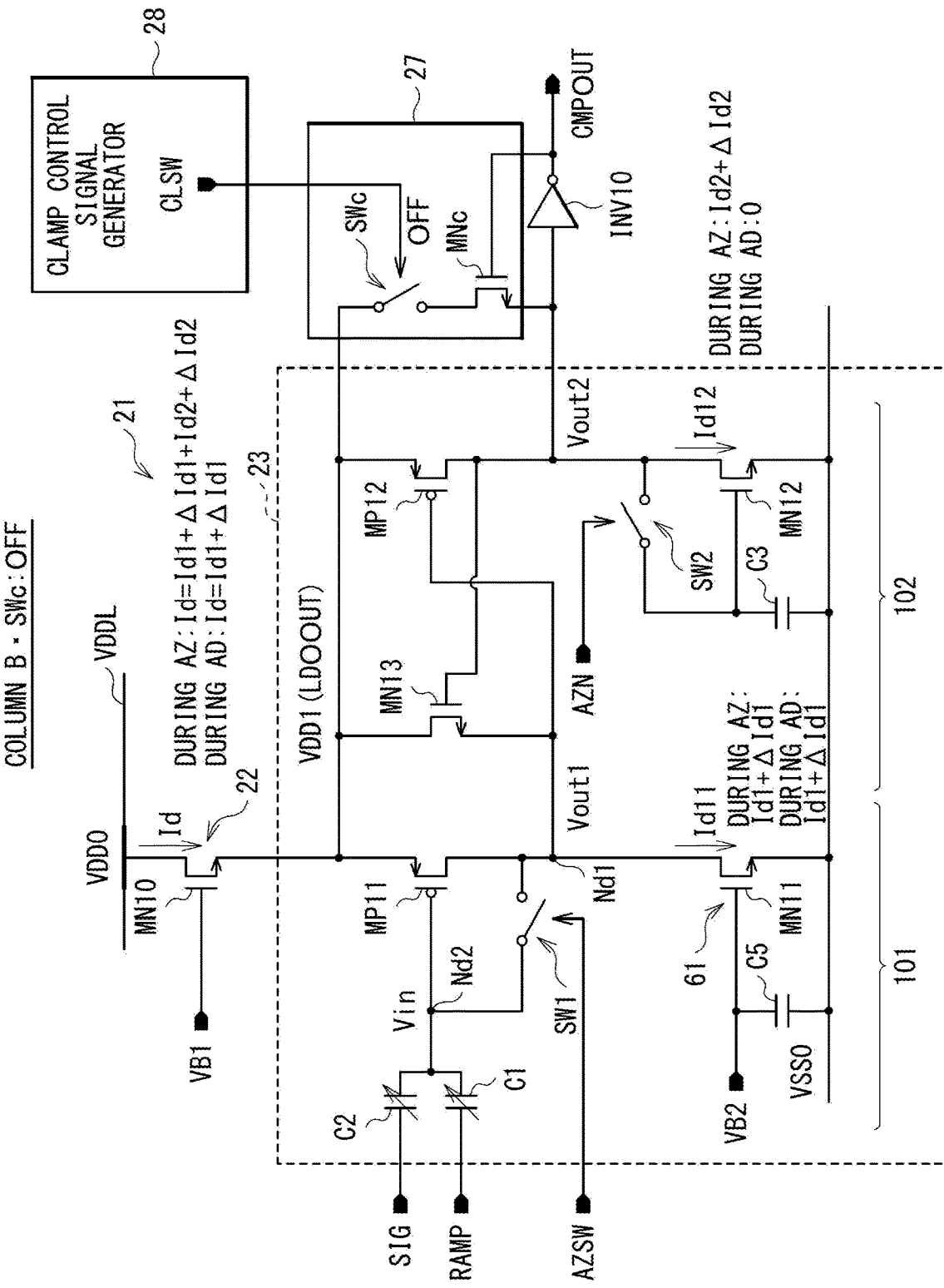
[FIG. 12]

[FIG. 13]
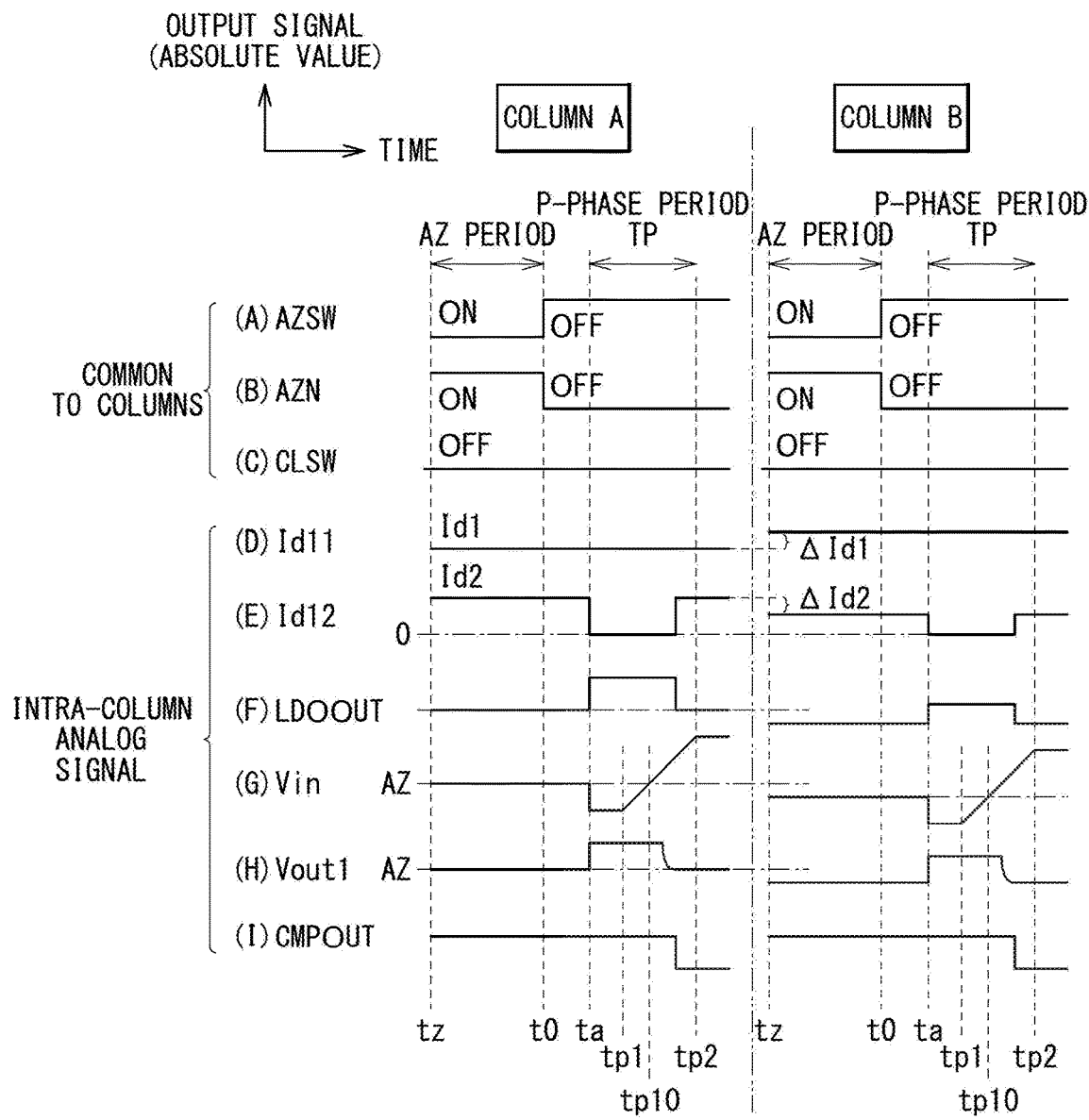

[FIG. 14]
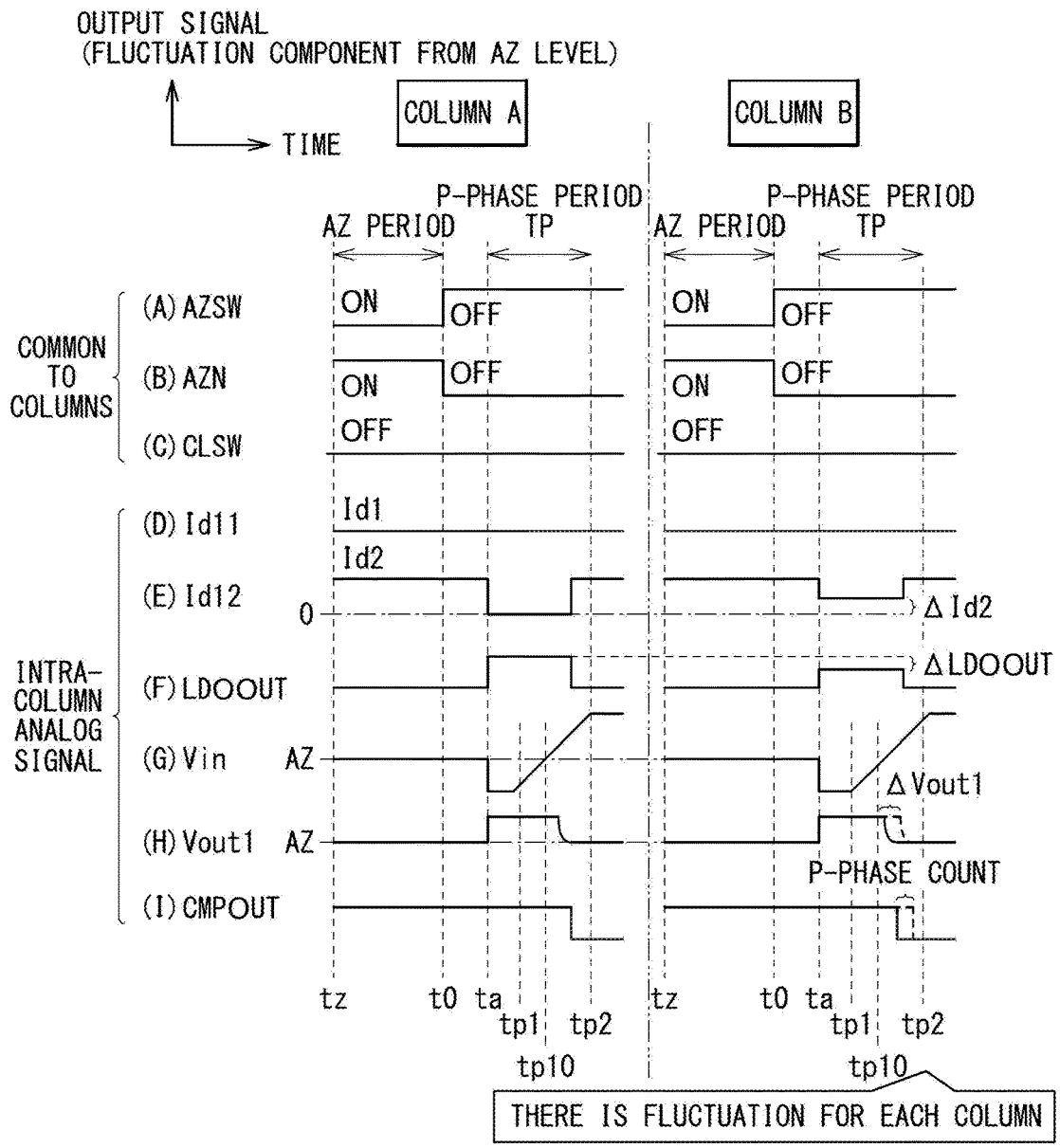

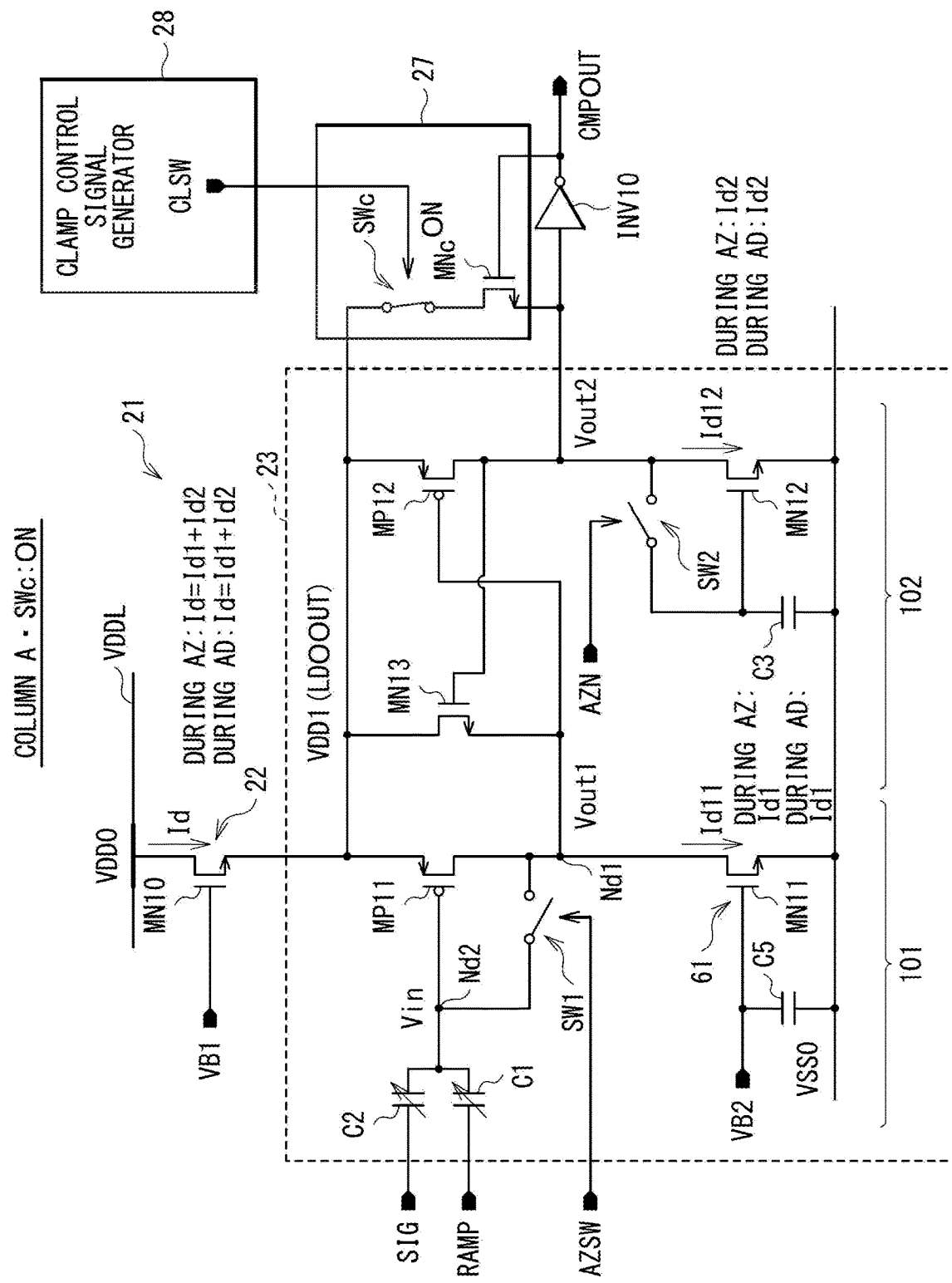
[FIG. 15]

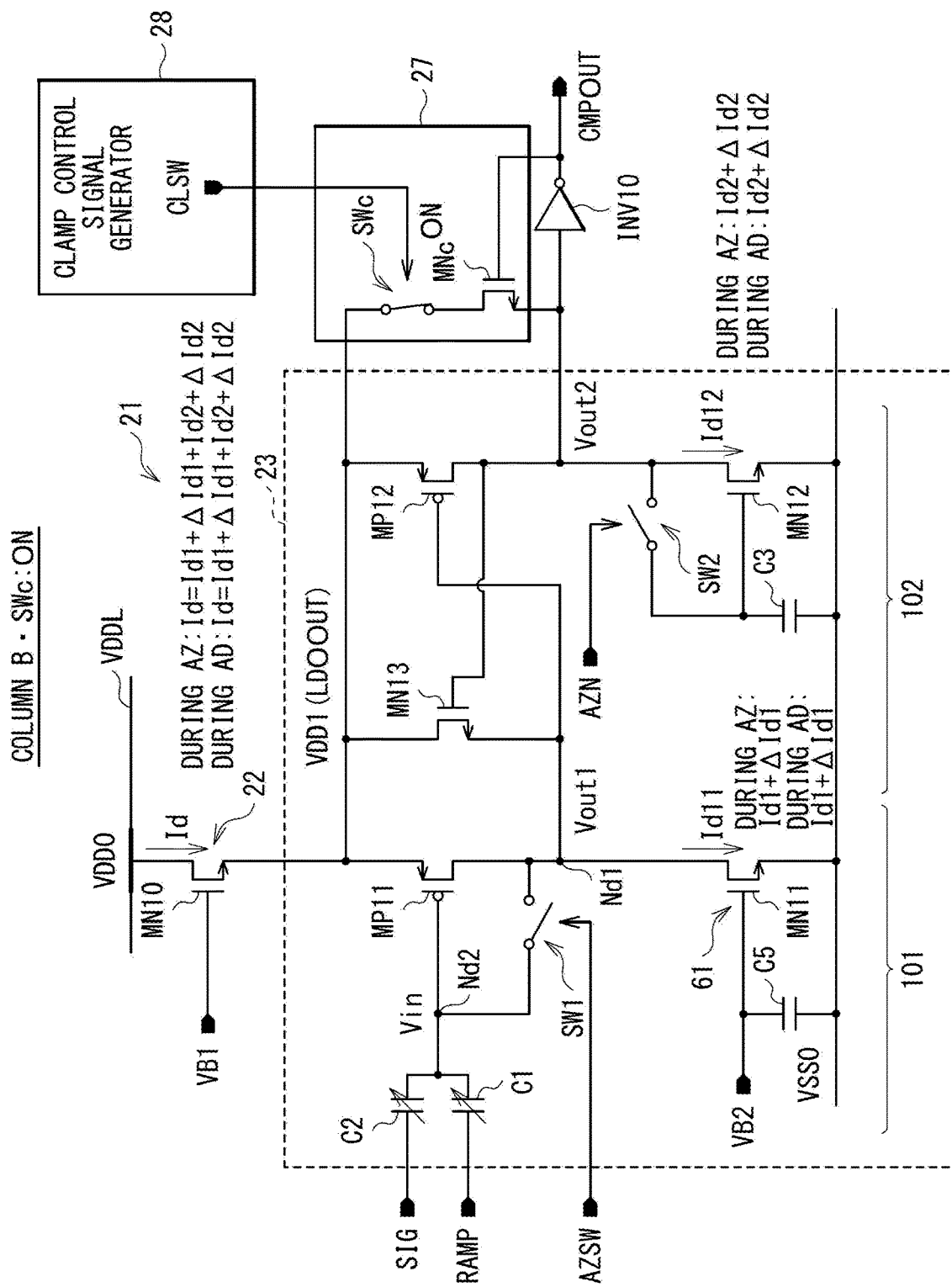
[FIG. 16]

[FIG. 17]
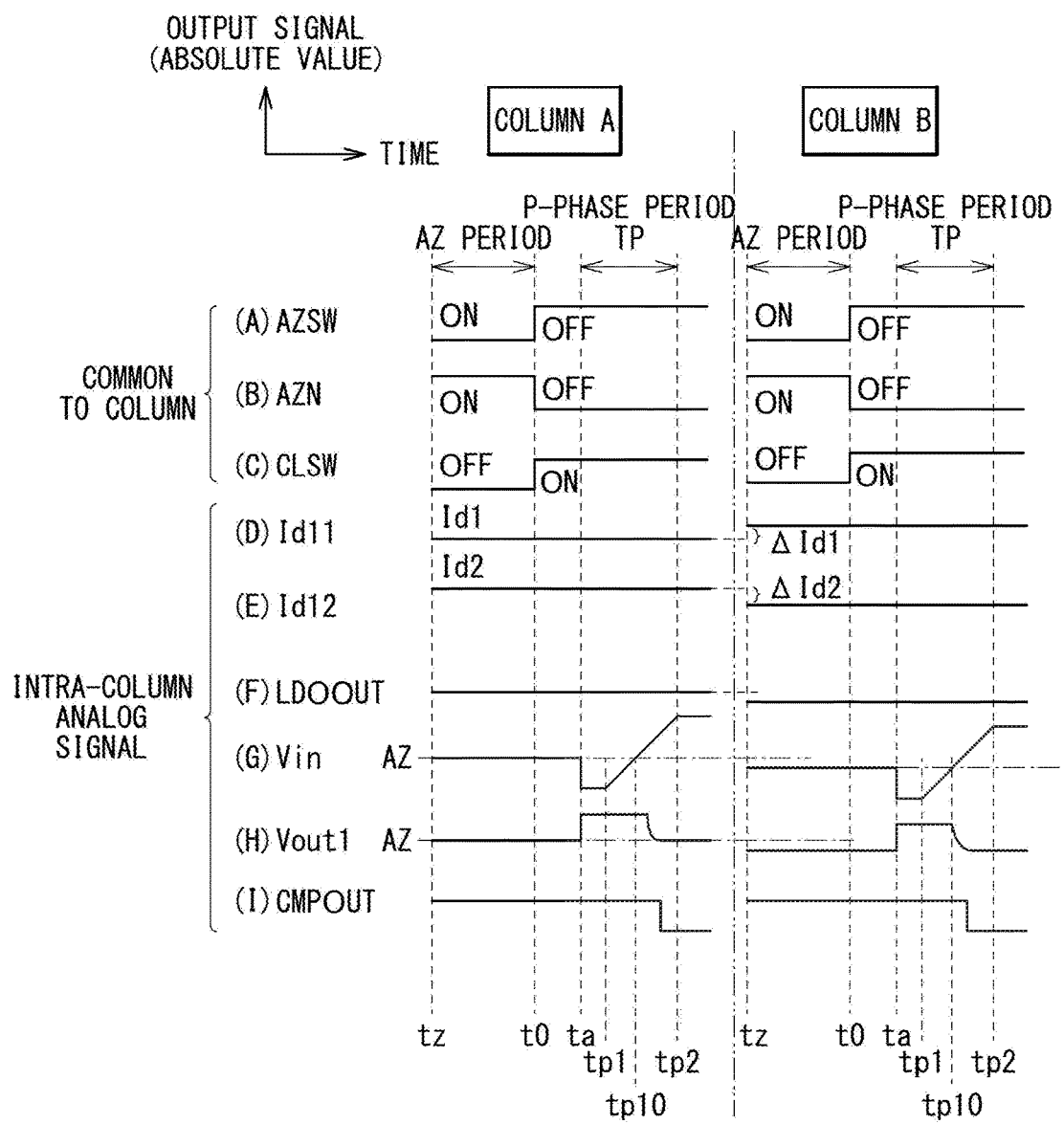

[FIG. 18]
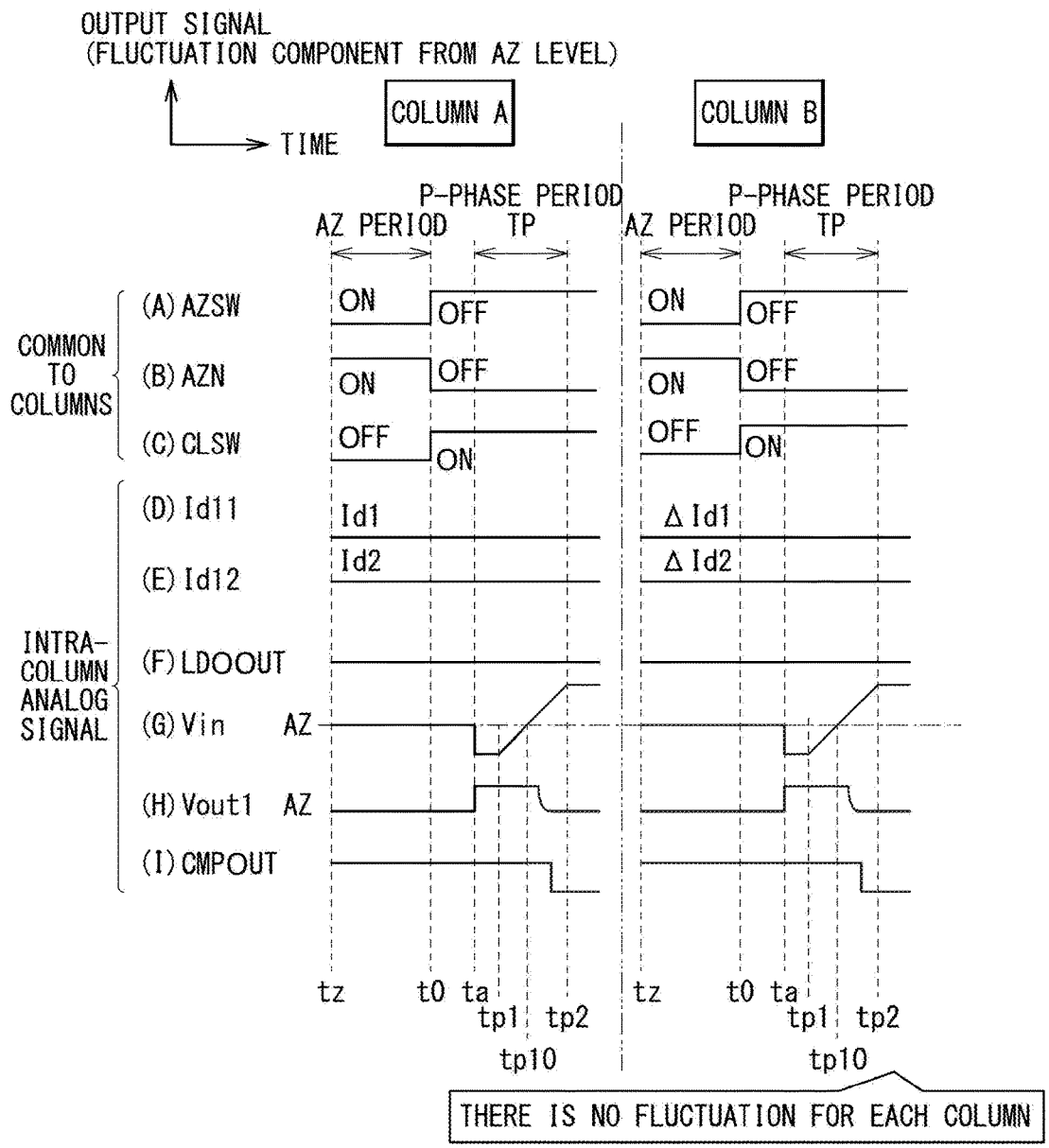

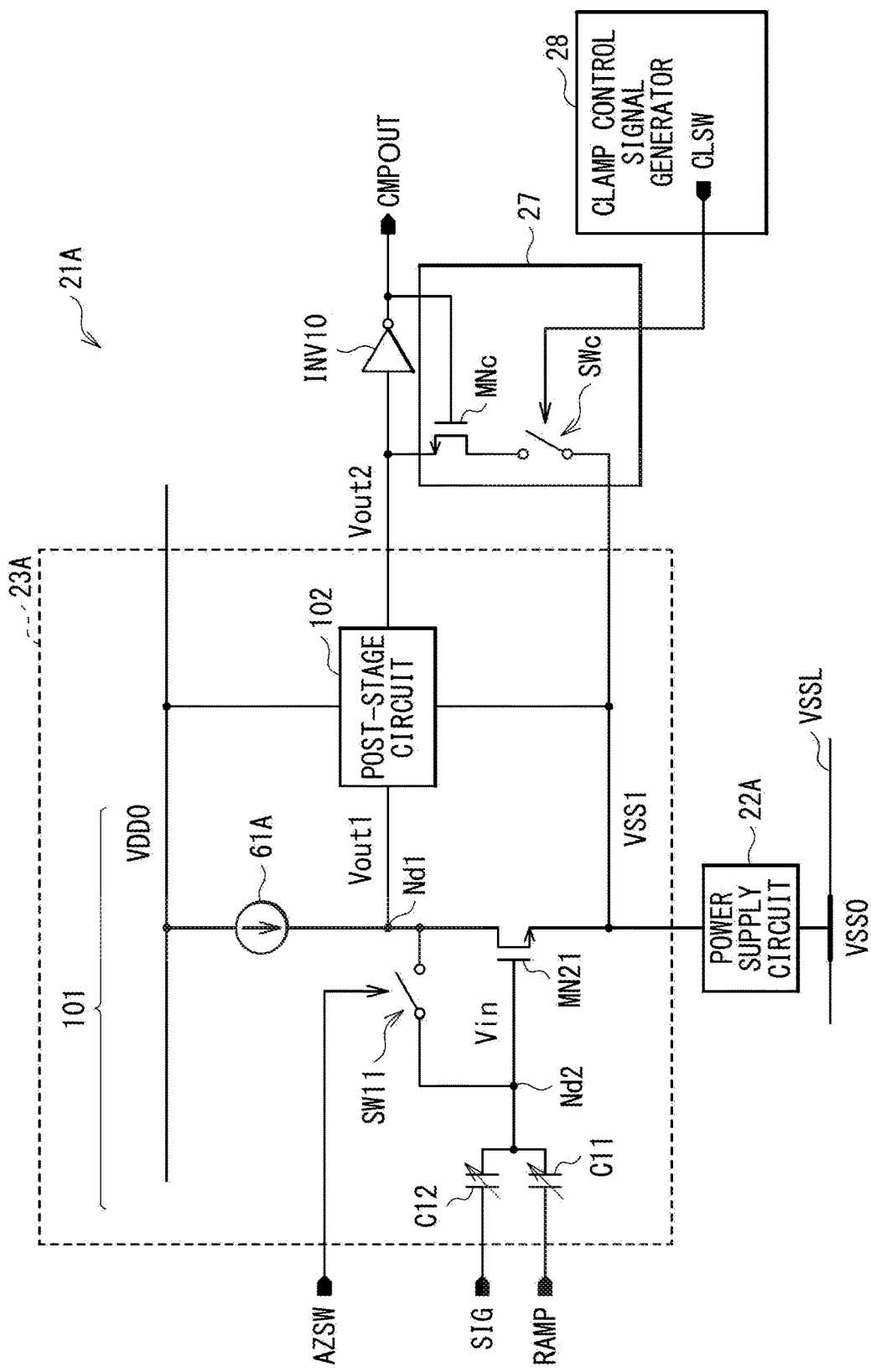
[FIG. 19A]

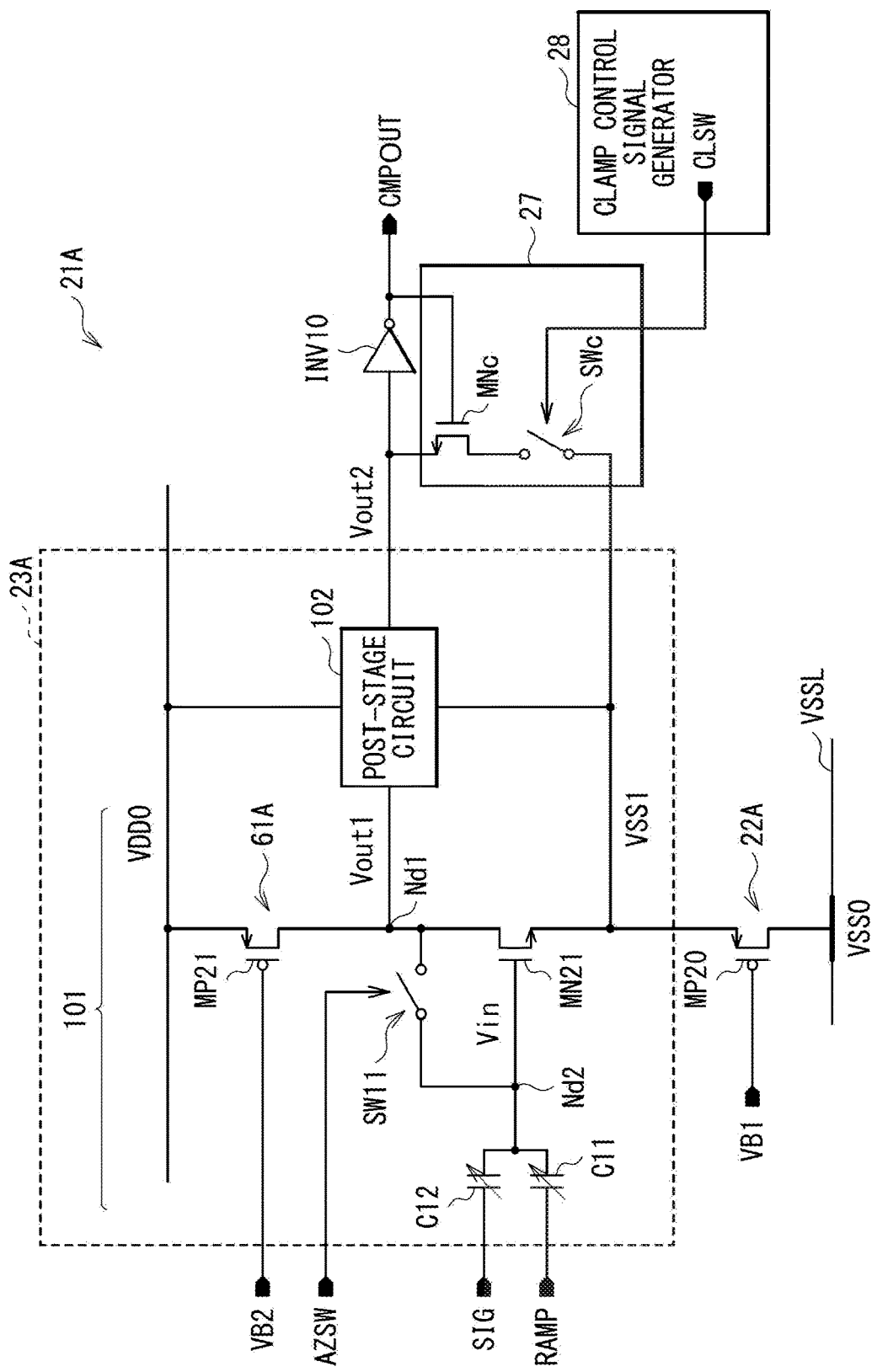
[FIG. 19B]

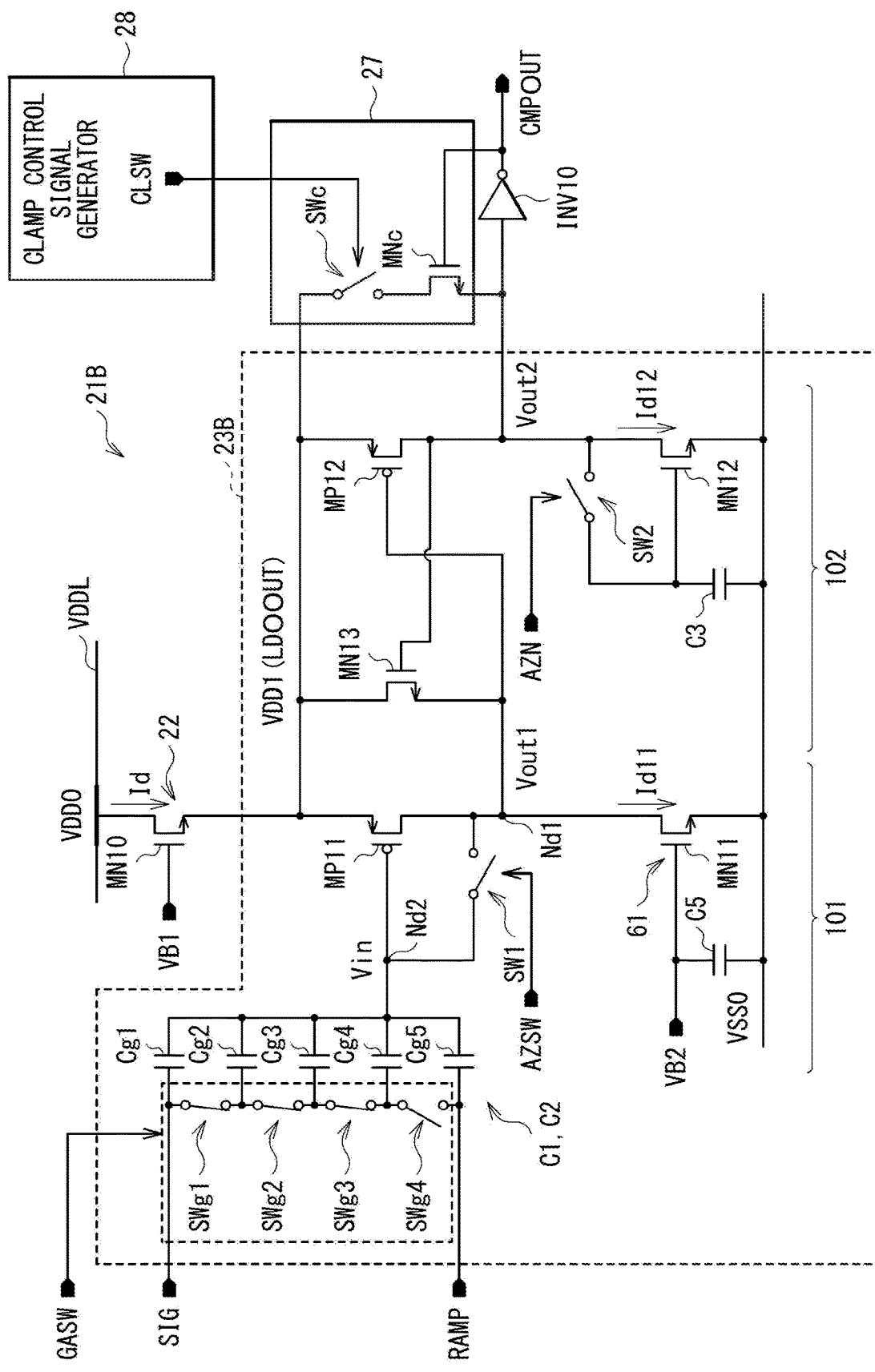
[FIG. 20]

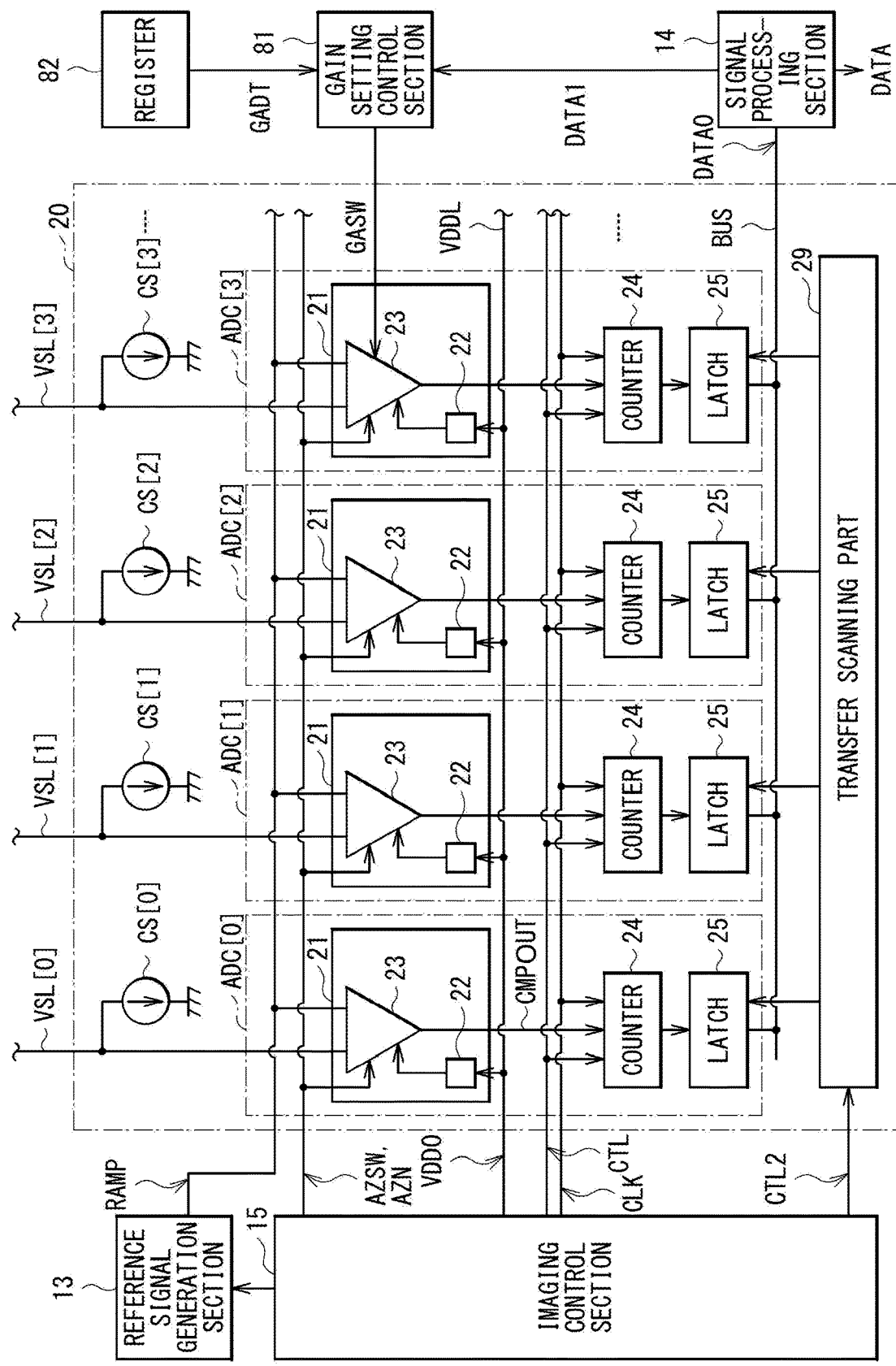
[FIG. 21]

[FIG. 22]
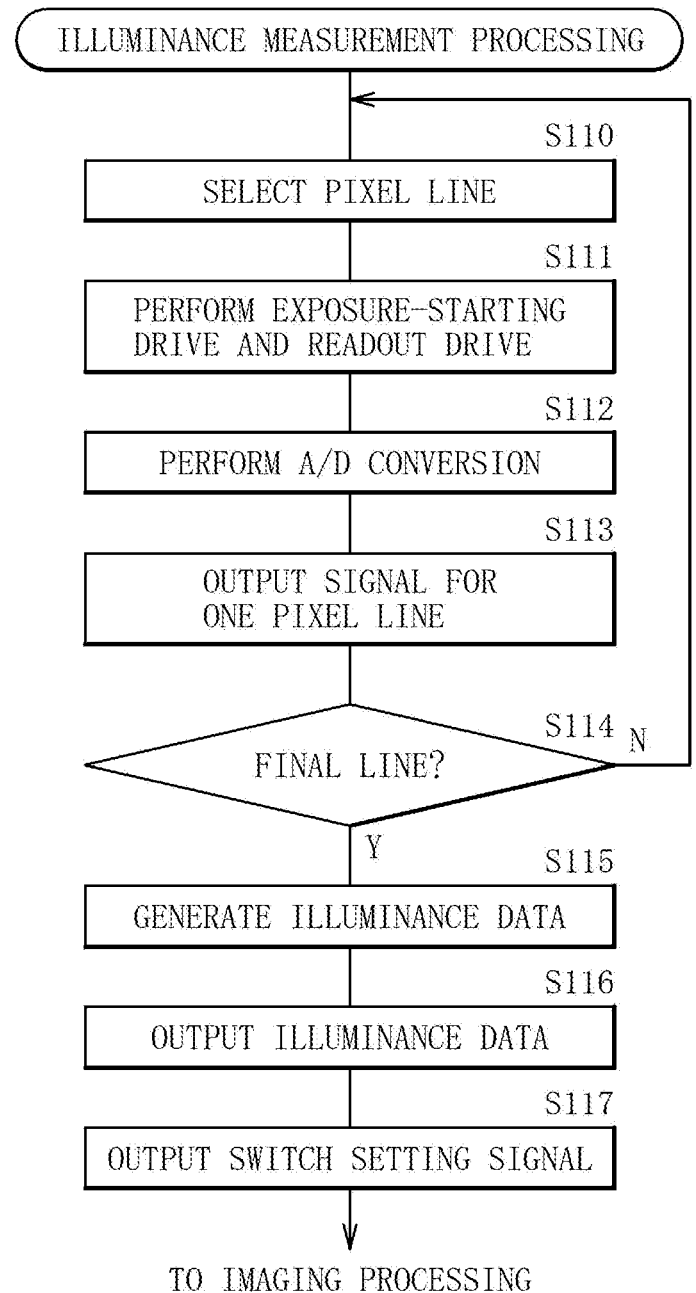

[FIG. 23]
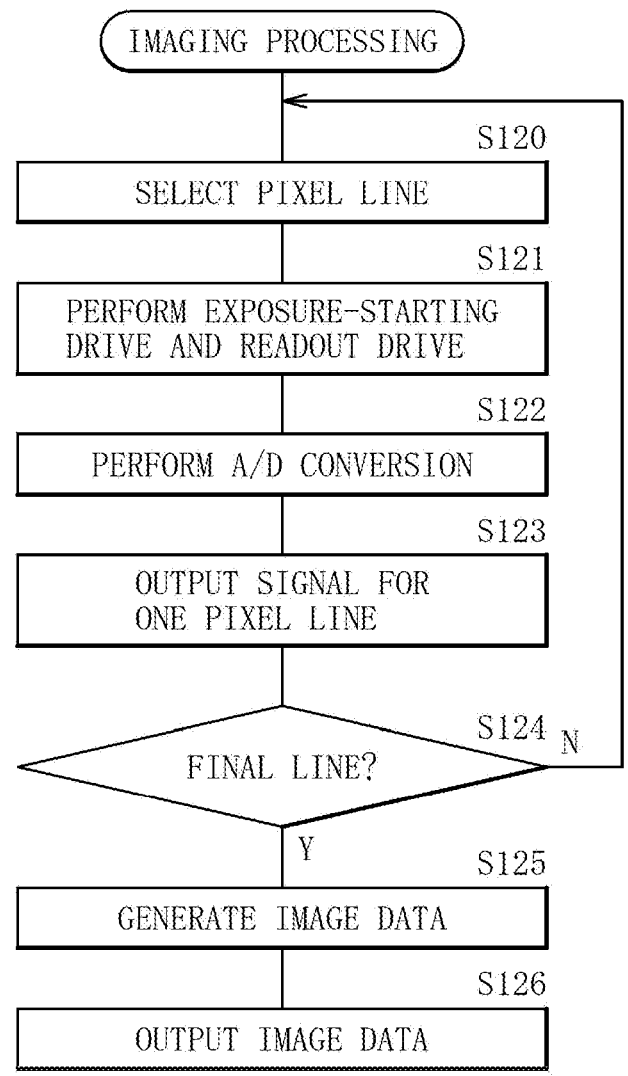

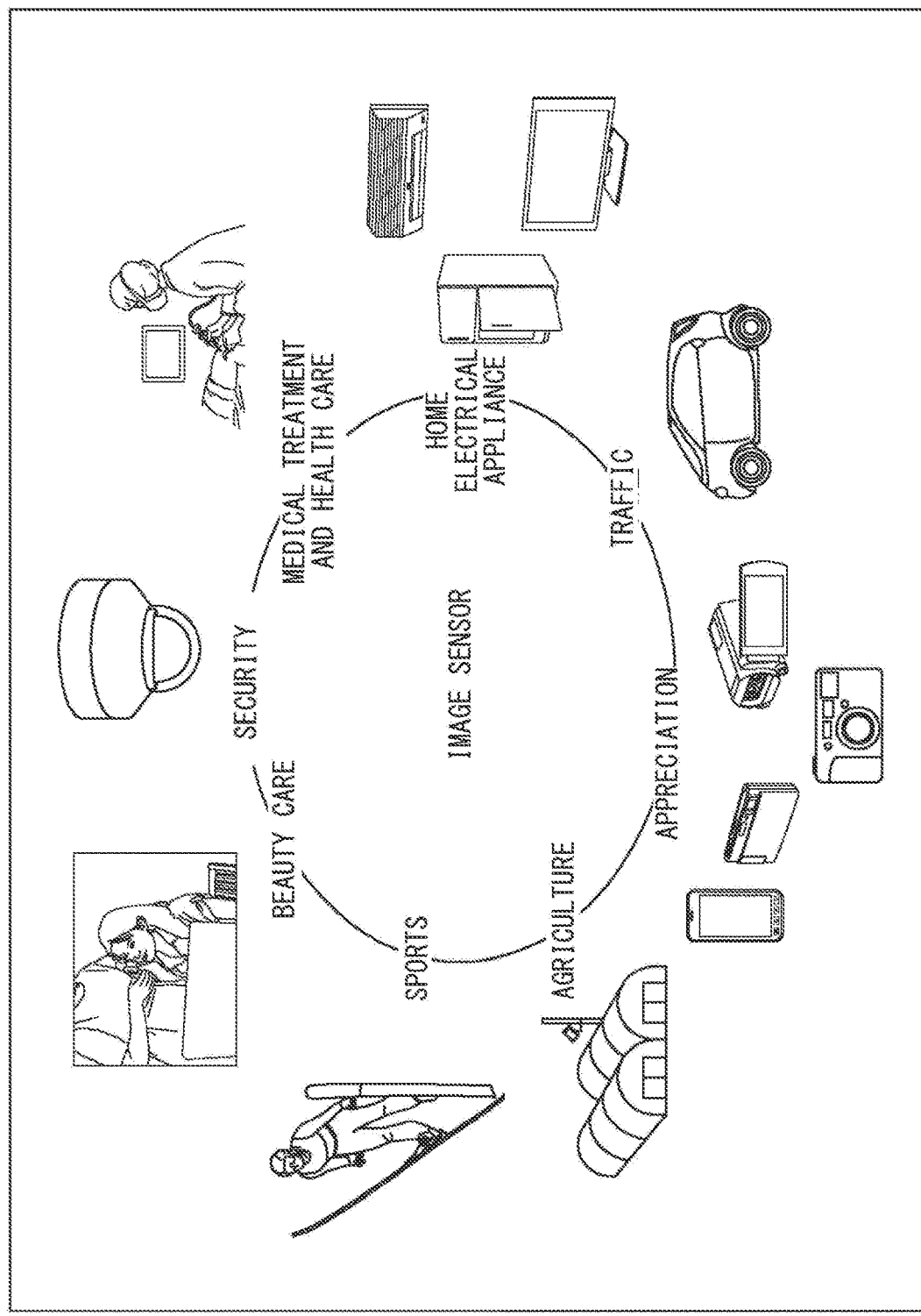
[FIG. 24]

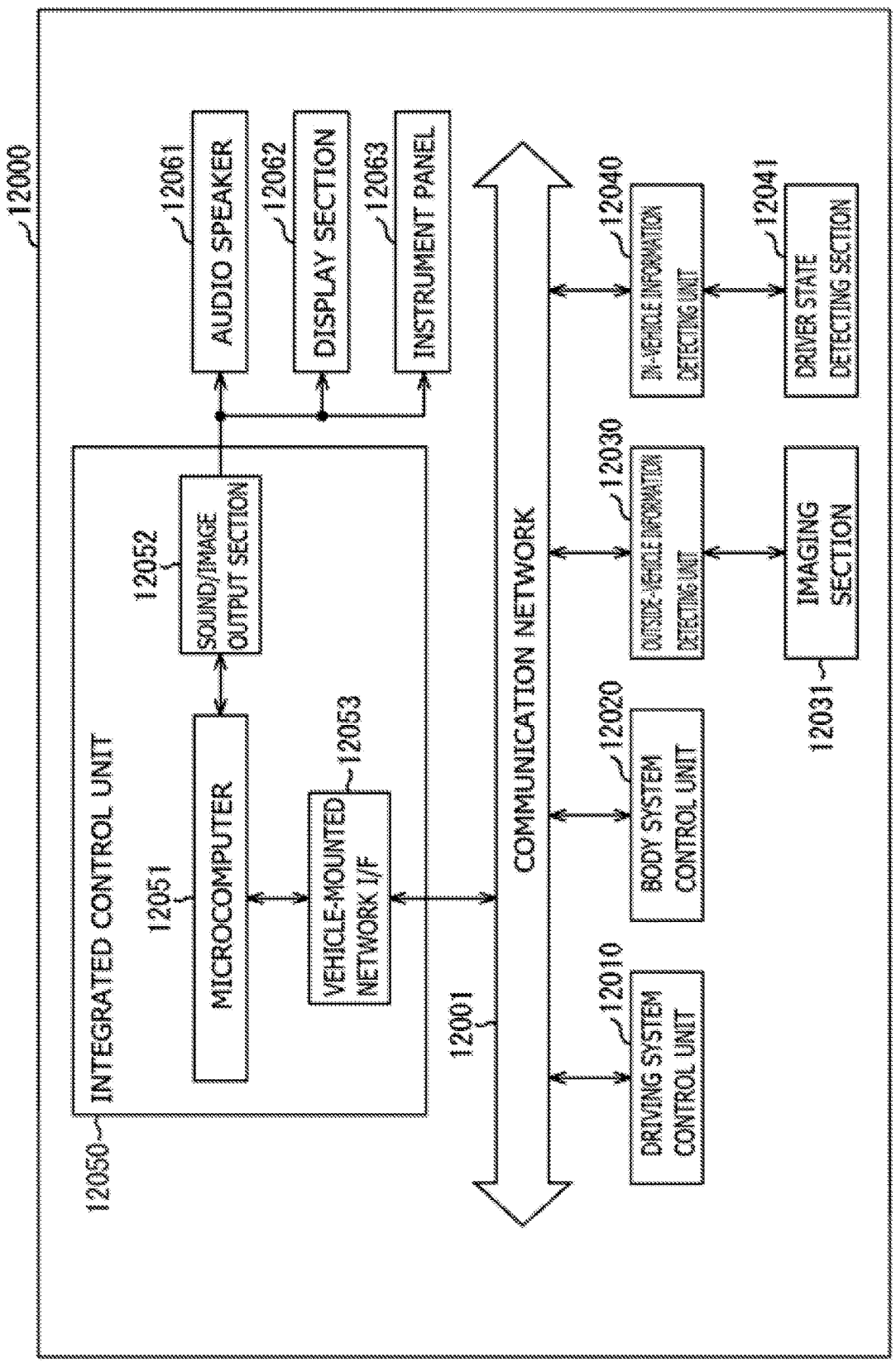

[FIG. 26]
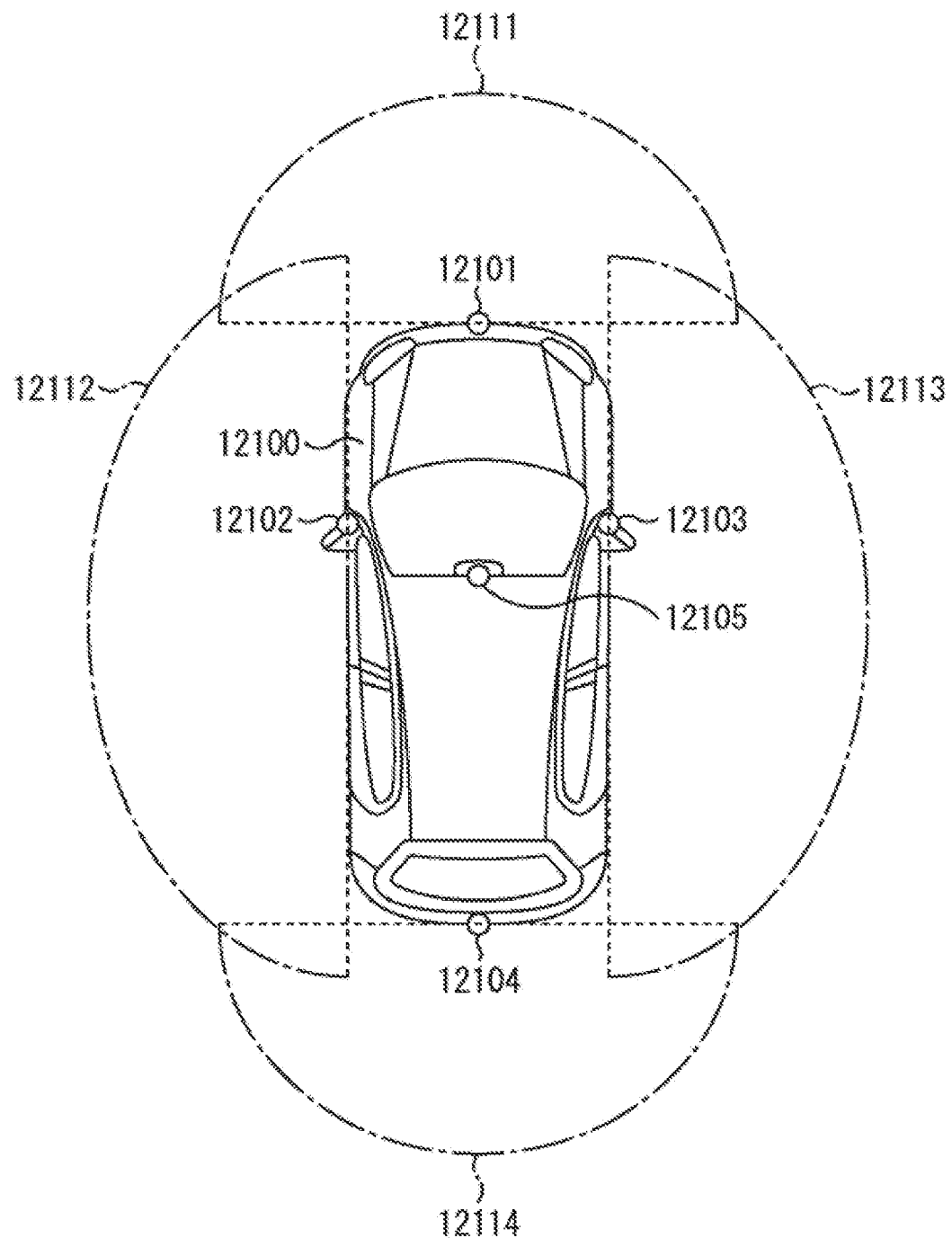

[FIG. 27]
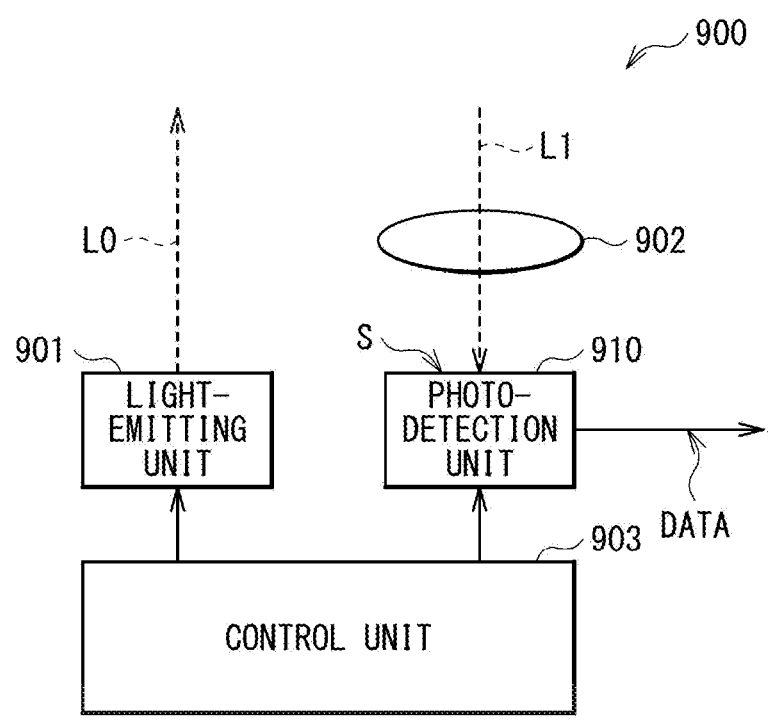

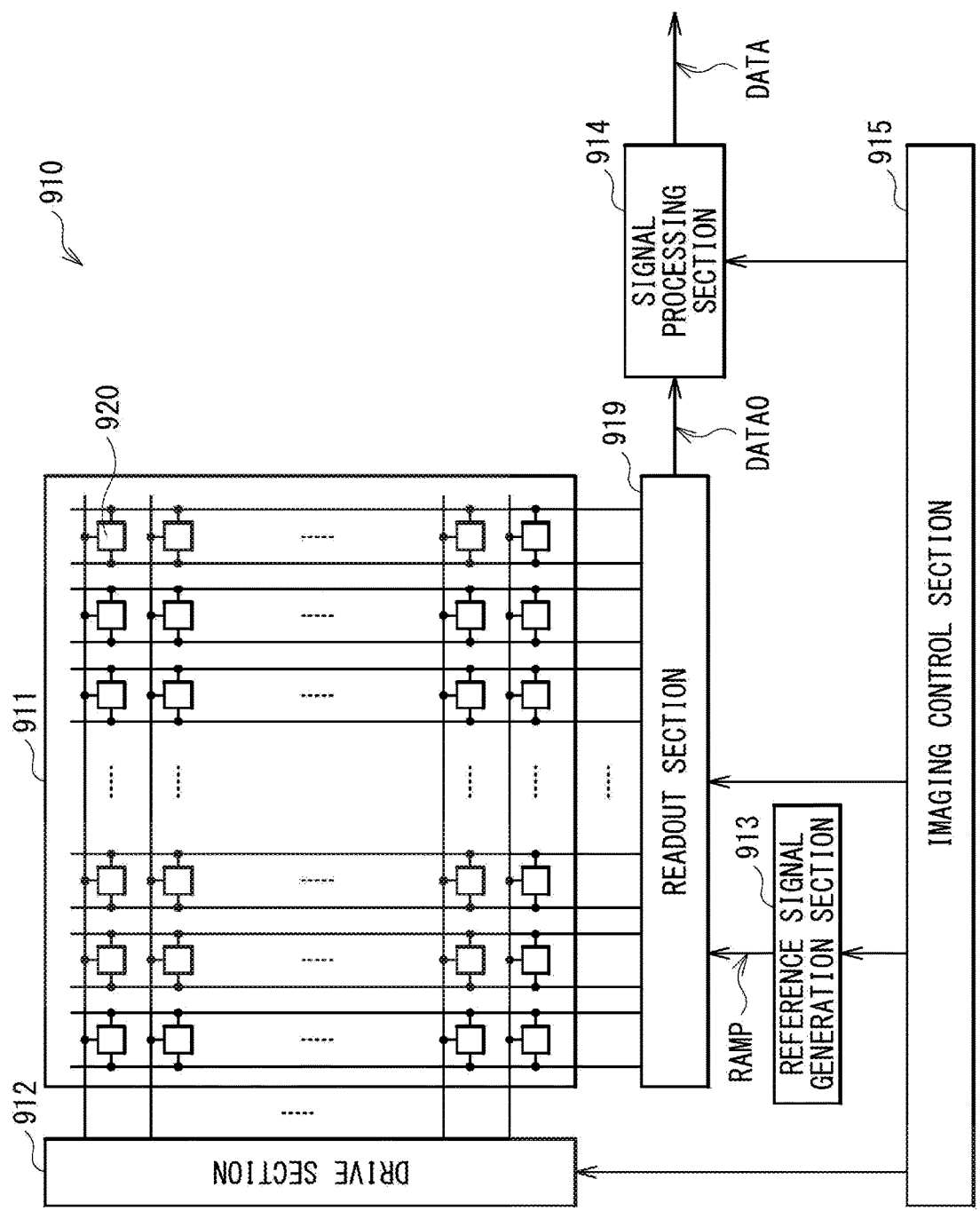
[FIG. 28]

[FIG. 29]
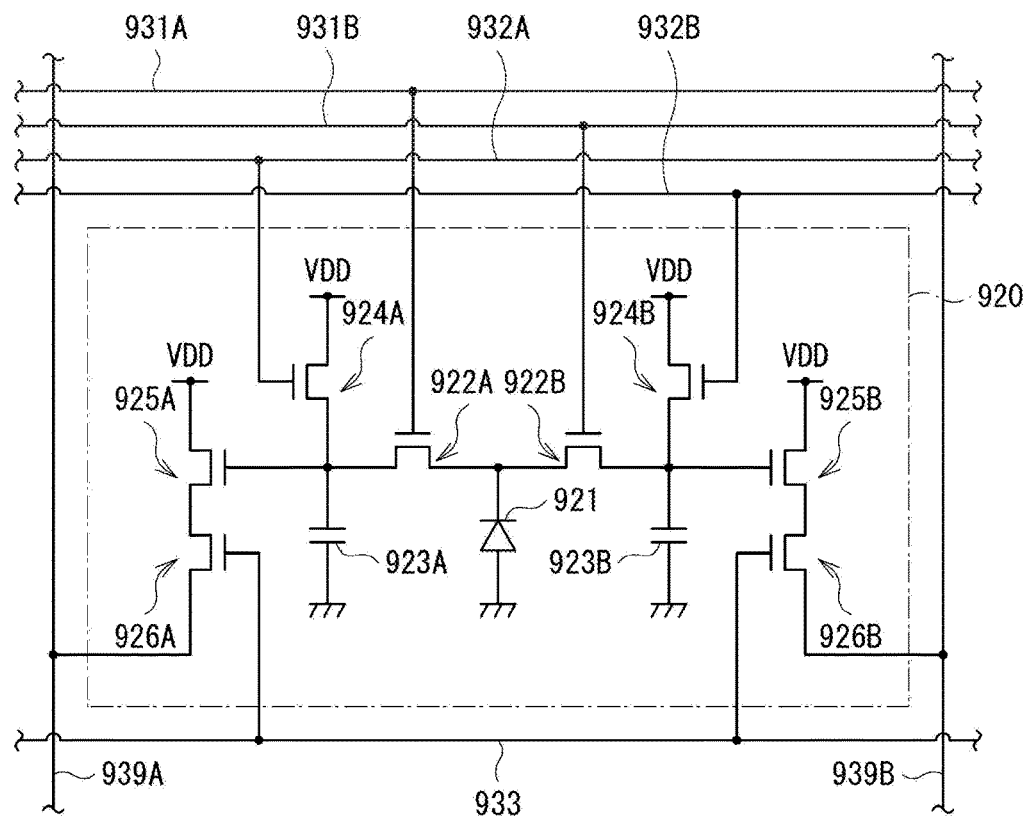
[FIG. 30A] LIGHT PULSE L0
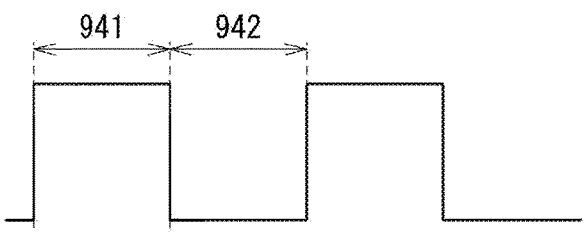
[FIG. 30B] REFLECTION LIGHT PULSE L1
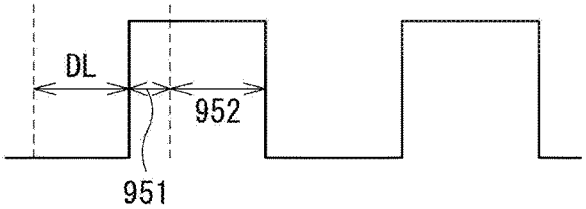

PHOTODETECTION DEVICE AND ELECTRONIC APPARATUS

CROSS REFERENCE TO RELATED APPLICATIONS

This application is a U.S. National Phase of International Patent Application No. PCT/JP2021/021636 filed on Jun. 7, 2021, which claims priority benefit of Japanese Patent Application No. JP 2020-115934 filed in the Japan Patent Office on Jul. 3, 2020. Each of the above-referenced applications is hereby incorporated herein by reference in its entirety.

TECHNICAL FIELD

The present disclosure relates to a photodetection device that is able to detect light and an electronic apparatus including such a photodetection device.

BACKGROUND ART

Some photodetection devices have pixels generate pixel signals corresponding to the amount of received light and have AD (Analog to Digital) conversion circuits convert the pixel signals into digital codes. The photodetection device is applied, for example, to an imaging device. PTL 1 discloses an imaging device that performs AD conversion on the basis of a signal having a ramp waveform and a pixel signal. In addition, PTL 1 discloses technology that reduces noise included in a pixel signal in a CDS (Correlated Double Sampling: correlated double sampling) method to enhance image quality.

CITATION LIST

Patent Literature

PTL 1: International Publication No. WO 2018/159343

SUMMARY OF THE INVENTION

It is desired to develop technology that makes it possible to achieve a further improvement in image quality.

It is desirable to provide a photodetection device and an electronic apparatus that make it possible to achieve an improvement in image quality.

A photodetection device according to an embodiment of the present disclosure includes: a plurality of pixels arranged in a matrix, the plurality of pixels each being configured to generate a pixel signal; a reference signal generation section configured to generate a reference signal; a plurality of AD converters provided for respective pixel columns of the plurality of pixels, and including a comparison circuit, in which the comparison circuit includes a first-stage amplifier circuit configured to output a first output signal corresponding to a comparison operation based on the pixel signal and the reference signal, and a second-stage amplifier circuit that is coupled to the first-stage amplifier circuit, and is configured to output a second output signal corresponding to the first output signal outputted from the first-stage amplifier circuit, and in which the plurality of AD converters performs AD conversion on the pixel signal on a basis of the second output signal; a plurality of clamp circuits provided for the comparison circuit of each of the plurality of AD converters, and each including a switch that is controlled on and off on a basis of a clamp control signal, in which the plurality of clamp circuits is configured to selectively clamp a voltage of the second output signal from the second-stage amplifier circuit by turning on the switch; and a control signal generator that generates the clamp control signal for each of the plurality of clamp circuits.

An electronic apparatus according to an embodiment of the present disclosure includes a photodetection device, and the photodetection device is configured by the photodetection device according to the embodiment of the present disclosure.

In the photodetection device or the electronic apparatus according to the embodiment of the present disclosure, in the comparison circuit in each of the plurality of AD converters, the first-stage amplifier circuit outputs the first output signal corresponding to the comparison operation based on the pixel signal and the reference signal, and the second-stage amplifier circuit outputs the second output signal corresponding to the first output signal. In the comparison circuit of each of the plurality of AD converters, the voltage of the second output signal from the second-stage amplifier circuit is able to be selectively clamped by the clamp circuit.

BRIEF DESCRIPTION OF THE DRAWINGS

FIG. 1 is a block diagram illustrating a configuration example of an imaging device according to an embodiment of the present disclosure.

FIG. 2 is a circuit diagram illustrating a configuration example of a pixel in the imaging device according to the embodiment.

FIG. 3 is a block diagram illustrating a configuration example of a readout section in the imaging device according to the embodiment.

FIG. 4A is a block diagram illustrating, in a partially simplified manner, a configuration example of a comparator in the imaging device according to the embodiment.

FIG. 4B is a block diagram illustrating a configuration example of the comparator in the imaging device according to the embodiment.

FIG. 5 is a circuit diagram illustrating a first modification example of a clamp circuit.

FIG. 6 is a circuit diagram illustrating a second modification example of the clamp circuit.

FIG. 7 is an explanatory diagram illustrating an example of a truth table related to an input and an output of a logical gate of the clamp circuit.

FIG. 8 is an explanatory diagram illustrating an example of a relationship between an AD conversion gain and a clamping function.

FIG. 9 is an explanatory diagram illustrating an implementation example in the imaging device according to the embodiment.

FIG. 10 is an explanatory diagram illustrating another implementation example in the imaging device according to the embodiment.

FIG. 11 is a circuit diagram illustrating an example of an operation state of the comparator in a case where a switch of the clamp circuit is turned off in a column A.

FIG. 12 is a circuit diagram illustrating an example of an operation state of the comparator in a case where a switch of the clamp circuit is turned off in a column B.

FIG. 13 is a timing waveform chart illustrating an example of a signal output state of the comparator in a case where the switch of the clamp circuit is turned off, with a signal value being set as an absolute value.

FIG. 14 is a timing waveform chart illustrating an example of a signal output state of the comparator in a case where the switch of the clamp circuit is turned off, with a signal value being set as a fluctuation component from an AZ level.

FIG. 15 is a circuit diagram illustrating an example of an operation state of the comparator in a case where the switch of the clamp circuit is turned on in the column A.

FIG. 16 is a circuit diagram illustrating an example of an operation state of the comparator in a case where the switch of the clamp circuit is turned on in the column B.

FIG. 17 is a timing waveform chart illustrating an example of a signal output state of the comparator in a case where the switch of the clamp circuit is turned on at a predetermined timing, with a signal value being set as an absolute value.

FIG. 18 is a timing waveform chart illustrating an example of a signal output state of the comparator in a case where the switch of the clamp circuit is turned on at a predetermined timing, with a signal value being set as a fluctuation component from the AZ level.

FIG. 19A is a circuit diagram illustrating, in a partially simplified manner, a configuration example of a comparator according to Modification Example 1.

FIG. 19B is a circuit diagram schematically illustrating a configuration example of the comparator according to Modification Example 1.

FIG. 20 is a circuit diagram schematically illustrating a configuration example of a comparator according to Modification Example 2.

FIG. 21 is a block diagram illustrating a configuration example of a peripheral part of a readout section in an imaging device according to Modification Example 2.

FIG. 22 is a flow chart schematically illustrating an example of illuminance measurement processing in the imaging device according to Modification Example 2.

FIG. 23 is a flow chart schematically illustrating an example of imaging processing in the imaging device according to Modification Example 2.

FIG. 24 is an explanatory diagram illustrating a usage example in the imaging device.

FIG. 25 is a block diagram depicting an example of schematic configuration of a vehicle control system.

FIG. 26 is a diagram of assistance in explaining an example of installation positions of an outside-vehicle information detecting section and an imaging section.

FIG. 27 is a block diagram illustrating a configuration example of a distance measuring device according to a practical application example.

FIG. 28 is a block diagram illustrating a configuration example of a photodetection unit illustrated in FIG. 27.

FIG. 29 is a circuit diagram illustrating a configuration example of a pixel illustrated in FIG. 28.

FIGS. 30A and 30B are waveform charts illustrating an operation example of the distance measuring device illustrated in FIG. 27.

MODES FOR CARRYING OUT THE INVENTION

Hereinafter, embodiments of the present disclosure are described in detail with reference to the drawings. It is to be noted that the description is given in the following order.
1. Embodiment (Imaging Device to which Photodetection Device is Applied)
    1.1 Configuration (FIGS. 1, 2, 3, 4A, 4B, 5, 6, 7, 8, 9 and 10)
    1.2 Operation and Workings (FIGS. 11 to 18)
    1.3 Effects
    1.4 Modification Examples (FIGS. 19A, 19B, and 20 to 23)
2. Usage Example of Imaging Device (FIG. 24)
3. Example of Practical Application to Mobile Body (FIGS. 25 to 26)
4. Example of Practical Application to Distance Measuring Device (FIGS. 27, 28, 29, 30A, and 30B)
5. Other Embodiments

1. Embodiment (Imaging Device to which Photodetection Device is Applied)

An electronic apparatus according to an embodiment of the present disclosure includes a photodetection device according to an embodiment of the present disclosure. The electronic apparatus corresponds to, for example, a smartphone, a digital camera, a video camera, a notebook personal computer, or the like.

Here, a case where a photodetection device according to an embodiment of the present disclosure is applied to an imaging device is described as an example.

1.1 Configuration

FIG. 1 illustrates a configuration example of an imaging device 1 to which the photodetection device according to an embodiment is applied. The imaging device 1 includes a pixel array 11, a drive section 12, a reference signal generation section 13, a readout section 20, a signal processing section 14, and an imaging control section 15.

The pixel array 11 includes a plurality of pixels P disposed in a matrix. Each of the pixels P is configured to generate a pixel voltage Vpix corresponding to the amount of received light.

FIG. 2 illustrates a configuration example of the pixel Pin the imaging device 1. The pixel array 11 includes a plurality of control lines TGL, a plurality of control lines RSTL, a plurality of control lines SELL, and a plurality of signal lines VSL. Each of the control lines TGL extends in a horizontal direction (a row direction, the lateral direction in FIG. 2) and one end thereof is coupled to the drive section 12. This control line TGL is supplied with a control signal STG by the drive section 12. Each of the control lines RSTL extends in the horizontal direction and one end thereof is coupled to the drive section 12. This control line RSTL is supplied with a control signal SRST by the drive section 12. Each of the control lines SELL extends in the horizontal direction and one end thereof is coupled to the drive section 12. This control line SELL is supplied with a control signal SSEL by the drive section 12. Each of the signal lines VSL extends in a vertical direction (a column direction, the longitudinal direction in FIG. 2) and one end thereof is coupled to the readout section 20. This signal lines VSL each transmit a signal SIG generated by the pixel P to the readout section 20. The plurality of pixels P provided side by side in one row in the horizontal direction (the lateral direction in each of FIGS. 1 and 2) is included in a pixel line L.

Each of the pixels P includes a photodiode PD, a transistor TG, a floating diffusion FD, and transistors RST, AMP, and SEL. Each of the transistors TG, RST, AMP, and SEL is an N-type MOS (Metal Oxide Semiconductor) transistor in this example.

The photodiode PD is a photoelectric conversion element that generates the amount of electric charge corresponding to the amount of received light and accumulates the generated electric charge therein. The anode of the photodiode PD is grounded and the cathode thereof is coupled to the source of the transistor TG.

The gate of the transistor TG is coupled to the control line TGL, the source thereof is coupled to the cathode of the photodiode PD, and the drain thereof is coupled to the floating diffusion FD.

The floating diffusion FD is configured to accumulate electric charge transferred from the photodiode PD through the transistor TG. The floating diffusion FD includes, for example, a diffusion layer formed on a surface of a semiconductor substrate. FIG. 2 illustrates the floating diffusion FD by using a symbol of a capacitor.

The gate of the transistor RST is coupled to the control line RSTL, the drain thereof is supplied with a power supply voltage VDD, and the source thereof is coupled to the floating diffusion FD.

The gate of the transistor AMP is coupled to the floating diffusion FD, the drain thereof is supplied with the power supply voltage VDD, and the source thereof is coupled to the drain of the transistor SEL.

The gate of the transistor SEL is coupled to the control line SELL, the drain thereof is coupled to the source of the transistor AMP, and the source thereof is coupled to the signal line VSL.

This configuration electrically couples the pixel P to the signal line VSL by turning on the transistor SEL in the pixel P on the basis of the control signal SSEL supplied to the control line SELL. This couples the transistor AMP to a constant current source CS (see FIG. 3 described below) of the readout section 20 and the transistor AMP operates as a so-called source follower. The pixel P then outputs, to the signal line VSL, the signal SIG including a voltage corresponding to the voltage at the floating diffusion FD. Specifically, as described below, the pixel P outputs a reset voltage Vreset in a P-phase period TP of two periods (the P-phase period TP and a D-phase period TD) in which the readout section 20 performs AD conversion. The pixel P outputs the pixel voltage Vpix corresponding to the amount of received light in the D-phase period TD. The pixel P outputs the signal SIG including these reset voltage Vreset and pixel voltage Vpix to the signal line VSL.

The drive section 12 (FIG. 1) is configured to sequentially drive the plurality of pixels P in the pixel array 11 in units of the pixel lines L on the basis of an instruction from the imaging control section 15. Specifically, the drive section 12 drives the plurality of pixels P in the pixel array 11 in units of the pixel lines L by suppling the plurality of respective control signals STG to the plurality of control lines TGL in the pixel array 11, suppling the plurality of respective control signals SRST to the plurality of control lines RSTL, and suppling the plurality of respective control signals SSEL to the plurality of control lines SELL.

The reference signal generation section 13 is configured to generate a reference signal RAMP on the basis of an instruction from the imaging control section 15. The reference signal RAMP has a so-called ramp waveform in which the voltage level is gradually changed with the lapse of time in the two periods (the P-phase period TP and the D-phase period TD) in which the readout section 20 performs AD conversion. The reference signal generation section 13 supplies this reference signal RAMP to the readout section 20.

The readout section 20 is configured to generate image signal DATA0 on the basis of an instruction from the imaging control section 15 by performing AD conversion on the basis of the signal SIG supplied from the pixel array 11 through the signal line VSL.

FIG. 3 illustrates a configuration example of the readout section 20 in the imaging device 1. It is to be noted that FIG. 3 also illustrates the reference signal generation section 13, the signal processing section 14, and the imaging control section 15 in addition to the readout section 20. The readout section 20 includes a plurality of constant current sources CS (constant current sources CS[0], CS[1], CS[2], CS[2], . . . ), a plurality of AD converters ADC (AD converters ADC[0], ADC[1], ADC[2], ADC[3], . . . ), and a transfer scanning part 29.

The plurality of constant current sources CS is provided in association with the plurality of signal lines VSL. Specifically, the 0th constant current source CS[0] is provided in association with a 0th signal line VSL[0], the first constant current source CS[1] is provided in association with a first signal line VSL[1], the second constant current source CS[2] is provided in association with a second signal line VSL[2], and the third constant current source CS[3] is provided in association with a third signal line VSL[3]. The same applies to fourth and subsequent constant current sources CS. One end of each of the constant current sources CS is coupled to the corresponding signal line VSL and the other end thereof is grounded. Each of the plurality of constant current sources CS is configured to apply a predetermined current to the corresponding signal line VSL.

The plurality of AD converters ADC is provided in association with the plurality of signal lines VSL. In other words, the AD converters ADC are provided for respective pixel columns of the plurality of pixels P. Specifically, the 0th AD converter ADC[0] is provided in association with the 0th signal line VSL[0], the first AD converter ADC[1] is provided in association with the first signal line VSL[1], the second AD converter ADC[2] is provided in association with the second signal line VSL[2], and the third AD converter ADC[3] is provided in association with the third signal line VSL[2]. The same applies to the fourth and subsequent AD converters ADC. Each of the plurality of AD converters ADC is configured to perform AD conversion on the basis of the signal SIG supplied from the pixel array 11, thereby converting the voltage of the signal SIG into a digital code CODE. The AD converter ADC includes a comparator 21, a counter 24, and a latch 25.

The comparator 21 is configured to perform a comparison operation on the basis of the reference signal RAMP supplied from the reference signal generation section 13 and the signal SIG supplied from the pixel P through the signal line VSL, thereby generating a signal CMPOUT. The comparator 21 sets an operation point on the basis of control signals AZSW and AZN supplied from the imaging control section 15 and then performs a comparison operation. The comparator 21 includes a power supply circuit 22 and a comparison circuit 23.

As illustrated in FIG. 3, the imaging control section 15 supplies power supply voltages VDD0 to a plurality of comparators 21 through a power supply line VDDL. In each of the plurality of comparators 21, the power supply circuit 22 generates a power supply voltage VDD1 on the basis of this power supply voltage VDD0 and supplies the generated power supply voltage VDD1 to the comparison circuit 23. The comparator 21 then performs a comparison operation on the basis of the reference signal RAMP and the signal SIG, thereby generating the signal CMPOUT.

The counter 24 is configured to perform a counting operation on the basis of the signal CMPOUT supplied from the comparator 21 and a control signal CTL supplied from the imaging control section 15. In the counting operation, the pulses of a clock signal CLK supplied from the imaging control section 15 are counted.

The latch 25 is configured to generate the digital code CODE on the basis of a count value obtained by the counter 24 and hold this digital code CODE. Specifically, the latch 25 generates the digital code CODE corresponding to a difference (CNTD-CNTP) between a count value CNTP obtained by the counter 24 in the P-phase period TP and a count value CNTD obtained by the counter 24 in the D-phase period TD. In this case, noise reduction processing by a CDS method is performed. The latch 25 then outputs this digital code CODE to a bus wiring line BUS on the basis of a control signal supplied from the transfer scanning part 29.

The transfer scanning part 29 is configured to control the latches 25 of the plurality of AD converters ADC to sequentially output the digital codes CODE to the bus wiring line BUS on the basis of a control signal CTL2 supplied from the imaging control section 15. The readout section 20 sequentially transfers, to the signal processing section 14, the plurality of digital codes CODE supplied from the plurality of AD converters ADC as the image signal DATA0 by using this bus wiring line BUS.

The signal processing section 14 (FIG. 1) is configured to perform predetermined signal processing on the image signal DATA0 to generate image signal DATA on the basis of an instruction from the imaging control section 15 and output this image signal DATA.

The imaging control section 15 is configured to supply control signals to the drive section 12, the reference signal generation section 13, the readout section 20, and the signal processing section 14 and control operations of these circuits, thereby controlling an operation in the imaging device 1. Specifically, the imaging control section 15 supplies a control signal to the drive section 12, thereby controlling the drive section 12 to sequentially drive the plurality of pixels P in the pixel array 11 in units of the pixel lines L. In addition, the imaging control section 15 supplies a control signal to the reference signal generation section 13, thereby controlling the reference signal generation section 13 to generate the reference signal RAMP. In addition, the imaging control section 15 supplies the power supply voltage VDD0 and bias voltages VB1 and VB2 to the readout section 20 and supplies the control signals AZSW, AZN, CTL, and CTL2 and the clock signal CLK to the readout section 20, thereby controlling the readout section 20 to generate the image signal DATA0 by performing AD conversion on the basis of the signal SIG. In addition, the imaging control section 15 supplies a control signal to the signal processing section 14, thereby controlling an operation of the signal processing section 14.

Configuration Example of Comparator 21

FIGS. 4A and 4B each illustrate a configuration example of the comparator 21. It is to be noted that FIG. 4A illustrates a configuration example of the comparator 21 in a partially simplified manner. The comparator 21 is supplied with the power supply voltage VDD0, a ground voltage VSS0, and the bias voltages VB1 and VB2. The power supply voltage VDD0 is supplied from the imaging control section 15 through the power supply line VDDL.

The comparator 21 includes the power supply circuit 22 and the comparison circuit 23. In addition, the comparator 21 includes an inverter INV10, a clamp circuit 27, and a clamp control signal generator 28.

As illustrated in FIG. 4B, the power supply circuit 22 includes, for example, a transistor MN10.

The comparison circuit 23 includes an initial-stage circuit 101 and a post-stage circuit 102. The initial-stage circuit 101 is able to output a signal Vout1 corresponding to a comparison operation based on the signal SIG and the reference signal RAMP. The post-stage circuit 102 is coupled to the initial-stage circuit 101 through a coupling node Nd1. The post-stage circuit 102 is able to output a signal Vout2 corresponding to the signal Vout1 outputted from the initial-stage circuit 101 through the coupling node Nd1.

The initial-stage circuit 101 includes capacitors C1 and C2, a transistor MP11, a constant current source 61, and a switch SW1. As illustrated in FIG. 4B, the constant current source 61 includes, for example, a transistor MN11 and a capacitor C5. The post-stage circuit 102 includes a transistor MMN13 and another circuit 103. As illustrated in FIG. 4B, the other circuit 103 includes, for example, a capacitor C3, transistors MP12 and MN12, and a switch SW2.

Hereinafter, a configuration example illustrated in FIG. 4B is described as an example; however, the configurations of the power supply circuit 22, the constant current source 61, and the post-stage circuit 102 are not limited to the configuration example illustrated in FIG. 4B.

The clamp circuit 27 includes a switch SWc and a transistor MNc.

The transistors MP11 and MP12 are P-type MOS transistors and the transistors MN10 to MN13 and the transistor MNc are N-type MOS transistors. Although not illustrated, the back gates of the transistors MP11 and MP12 are each supplied with the power supply voltage VDD0 and the back gates of the transistors MN10 to MN12 are each supplied with the ground voltage VSS0 in this example.

Here, the signal SIG corresponds to a specific example of a "pixel signal" in the technology according to the present disclosure. The signal Vout1 corresponds to a specific example of a "first output signal" in the technology according to the present disclosure. The signal Vout2 corresponds to a specific example of a "second output signal" in the technology according to the present disclosure. The initial-stage circuit 101 corresponds to a specific example of a "first-stage amplifier circuit" in the technology according to the present disclosure. The post-stage circuit 102 corresponds to a specific example of a "second-stage amplifier circuit" in the technology according to the present disclosure. The switch SWc corresponds to a specific example of a "switch" in the technology according to the present disclosure. The transistor MP11 corresponds to a specific example of a "first transistor" in the technology according to the present disclosure. The transistor MP12 corresponds to a specific example of a "second transistor" in the technology according to the present disclosure. The capacitor C1 corresponds to a specific example of a "first capacitor" in the technology according to the present disclosure. The capacitor C2 corresponds to a specific example of a "second capacitor" in the technology according to the present disclosure. The transistor MN11 corresponds to a specific example of a "first load transistor" in the technology according to the present disclosure. The transistor MN12 corresponds to a specific example of a "second load transistor" in the technology according to the present disclosure. The P-phase period TP corresponds to a specific example of a "first period" in the technology according to the present disclosure. The D-phase period TD corresponds to a specific example of a "second period" in the technology according to the present disclosure. The clamp control signal generator 28 corresponds to a specific example of a "clamp control signal generator" in the technology according to the present disclosure.

The power supply circuit 22 is provided for each comparison circuit 23 of the plurality of AD converters ADC, and supplies the common power supply voltage VDD1 to the initial-stage circuit 101 and the post-stage circuit 102. In the power supply circuit 22, the gate of the transistor MN10 is supplied with the bias voltage VB1, the drain thereof is coupled to the power supply line VDDL, and the source thereof is coupled to the sources of the transistors MP11 and MP12 and the drain of a transistor MN13. The transistor MN10 operates as a so-called source follower, thereby outputting the power supply voltage VDD1 from the source. In addition, the source of the transistor MN10 is coupled to one end of the switch SWc in the clamp circuit 27.

Each of the capacitors C1 and C2 has one end and the other end. The one end of the capacitor C1 is coupled to the reference signal generation section 13 and the other end thereof is coupled to the other end of the capacitor C2, the gate of the transistor MP11, and one end of the switch SW1. This one end of the capacitor C1 is supplied with the reference signal RAMP generated by the reference signal generation section 13. The one end of the capacitor C2 is coupled to the signal line VSL and the other end thereof is coupled to the other end of the capacitor C1, the gate of the transistor MP11, and the one end of the switch SW1. This one end of the capacitor C2 is supplied with the signal SIG generated by the pixel P.

At least one of the capacitor C1 or the capacitor C2 may have a variable capacitance. Thus, the capacitance ratio between the capacitor C1 and the capacitor C2 may be changeable.

The gate of the transistor MP11 is coupled to the other ends of the capacitors C1 and C2 and the one end of the switch SW1 through a coupling node Nd2. The signal SIG is inputted to the gate of the transistor MP11 through the capacitor C2. In addition, the reference signal RAMP is inputted to the gate of the transistor MP11 through the capacitor C1.

The drain of the transistor MP11 is coupled to the drain of the transistor MN11, the gate of the transistor MP12, and the other end of the switch SW1 through the coupling node Nd1 and the source thereof is coupled to the sources of the transistors MN10 and MP12. In addition, the drain of the first transistor is coupled to the source of the transistor MN13 through the coupling node Nd1.

The switch SW1 is configured to be turned on and off on the basis of the control signal AZSW. The one end of the switch SW1 is coupled to the other ends of the capacitors C1 and C2 and the gate of the transistor MP11 through the coupling node Nd2 and the other end thereof is coupled to the drain of the transistor MN11 and the gate of the transistor MP12 through the coupling node Nd1. In addition, the other end of the switch SW1 is coupled to the drain of the transistor MP11. In addition, the other end of the switch SW1 is coupled to the source of the transistor MN13 through the coupling node Nd1.

The gate of the transistor MN11 is supplied with the bias voltage VB2. The drain of the transistor MN11 is coupled to the drain of the transistor MP11, the gate of the transistor MP12, and the other end of the switch SW1 through the coupling node Nd1. In addition, the drain of the transistor MN11 is coupled to the source of the transistor MN13 through the coupling node Nd1. The source of the transistor MN11 is supplied with the ground voltage VSS0. The transistor MN11 is a load transistor serving as a load of the transistor MP11. The transistor MN11 operates as a constant current source.

One end of the capacitor C5 is coupled to the gate of the transistor MN11 and the other end thereof is supplied with the ground voltage VSS0. It is to be noted that the capacitor C5 may be configured by using a MOS capacitor or the like. The capacitor C5 may be configured by using, for example, the parasitic capacitance of the gate of the transistor MN11, the parasitic capacitance of a wiring line, or the like. The capacitor C5 is included in a sample hold circuit.

The gate of the transistor MP12 is coupled to the drains of the transistors MP11 and MN11 and the other end of the switch SW1 through the coupling node Nd1, the drain thereof is coupled to the drain of the transistor MN12 and one end of the switch SW2, and the source thereof is coupled to the sources of the transistors MN10 and MP11. In addition, the drain of the transistor MP12 is coupled to the gate of the transistor MN13.

The gate of the transistor MN12 is coupled to one end of the capacitor C3 and the other end of the switch SW2, the drain thereof is coupled to the drain of the transistor MP12 and the one end of the switch SW2, and the source thereof is supplied with the ground voltage VSS0. The transistor MN12 is a load transistor serving as a load of the transistor MP12 and operates as a constant current source.

The gate of transistor MN13 is supplied with the signal Vout2, the drain thereof is coupled to the sources of the transistors MN10, MP11, and MP12, and the source thereof is coupled to the drains of the transistors MP11 and MN11, the gate of the transistor MP12, and the other end of the switch SW1. On the basis of the voltage of the signal Vout2, the transistor MN13 controls the drain voltage of the transistor MN11, which operates as a constant current source, not to be too low. This makes it possible, for example, to maintain a constant current property of the transistor MN11 and to suppress the interference between the plurality of AD converters ADC.

The switch SW2 is configured to be turned on and off on the basis of the control signal AZN. The one end of the switch SW2 is coupled to the drains of the transistors MP12 and MN12 and the other end thereof is coupled to the gate of the transistor MN12 and the one end of the capacitor C3. In addition, the one end of the switch SW2 is coupled to the gate of the transistor MN13.

The one end of the capacitor C3 is coupled to the gate of the transistor MN12 and the other end of the switch SW2 and the other end thereof is supplied with the ground voltage VSS0. It is to be noted that the capacitor C3 may be configured by using a MOS capacitor or the like. The capacitor C3 may be configured by using, for example, the parasitic capacitance of the gate of the transistor MN12, the parasitic capacitance of the switch SW2, the parasitic capacitance of a wiring line, or the like.

In the comparator 21, the power supply circuit 22 generates the power supply voltage VDD1 and the comparison circuit 23 operates on the basis of this power supply voltage VDD1, thereby performing a comparison operation on the basis of the signal SIG and the reference signal RAMP. Specifically, a current Id generated by the transistor MN11 that operates as a constant current source flows through the transistor MN10 and the transistor MN10 operates as a so-called source follower. This causes the power supply circuit 22 to generate the power supply voltage VDD1. In the comparison circuit 23, as described below, the operation point is set by turning on the switches SW1 and SW2. The comparison circuit 23 then performs a comparison operation on the basis of the reference signal RAMP and the reset voltage Vreset included in the signal SIG in the P-phase period TP and performs a comparison operation on the basis of the reference signal RAMP and the pixel voltage Vpix included in the signal SIG in the D-phase period TD.

The switch SW1 is able to couple the gate of the transistor MP11 and the drain of the transistor MP11 by being turned on.

The inverter INV10 includes an input end and an output end. The inverter INV10 is provided for each comparison circuit 23 of the plurality of AD converters ADC. The inverter INV10 outputs the signal CMPOUT obtained by inverting the signal Vout2 outputted from the post-stage circuit 102. The clamp circuit 27 is coupled to the input end and the output end of the inverter INV10.

The clamp circuit 27 is provided for each comparison circuit 23 of the plurality of AD converters ADC. The switch SWc of the clamp circuit 27 is controlled on and off on the basis of a clamp control signal CLSW. The switch SWc is turned on, thereby enabling the clamp circuit 27 to selectively clamp the voltage of the signal Vout2 outputted from the post-stage circuit 102.

The gate of the transistor MNc in the clamp circuit 27 is coupled to the output end of the inverter INV10, and the signal CMPOUT is inputted thereto. The source of the transistor MNc is coupled to the input end of the inverter INV10, the drains of the transistors MP12 and the MN12, the gate of the transistor MN13, and the one end of the switch SW2. The drain of the transistor MNc is coupled to the other end of the switch SWc.

The one end of the switch SWc in the clamp circuit 27 is coupled to the source of the transistor MN10, the sources of the transistors MP11 and MP12, and the drain of the transistor MN13. The other end of the switch SWc is coupled to the drain of the transistor MNc in the clamp circuit 27.

The clamp control signal generator 28 generates the clamp control signal CLSW for each comparison circuit 23 of the plurality of AD converters ADC. The control signal generator 28 may generate the clamp control signal CLSW on the basis of each AD conversion gain of the plurality of AD converters ADC.

Each of the plurality of pixels P outputs, as a pixel signal, the signal SIG to have the reset voltage Vreset in the P-phase period TP, and then outputs the signal SIG to have the pixel voltage Vpix corresponding to the amount of received light in the D-phase period TD. The reference signal generation section 13 generates the reference signal RAMP to have a predetermined reference voltage (AZ voltage) in a predetermined period before the start of the P-phase period TP and in a predetermined period before the start of the D-phase period TD. As described later, the control signal generator 28 may generate, as the clamp control signal CLSW, a signal that turns on the switch of the clamp circuit 27 in synchronization with a timing of completion of the predetermined period in which the predetermined reference voltage (AZ voltage) is obtained.

FIG. 5 illustrates a first modification example of the clamp circuit 27.

A clamp circuit 27A according to the first modification example includes the switch SWc and a logical gate AND1.

The logical gate AND1 is an AND gate and has a first input terminal, a second input terminal, and an output terminal. The clamp control signal CLSW from the clamp control signal generator 28 is inputted to the first input terminal of the logical gate AND1. The signal CMPOUT is inputted to the second input terminal of the logical gate AND1.

In the clamp circuit 27A, the switch SWc is controlled on and off by an output signal from the output terminal of the logical gate AND1. In the clamp circuit 27A, the one end of the switch SWc is coupled to the source of the transistor MN10, the sources of the transistors MP11 and MP12, and the drain of the transistor MN13. The other end of the switch SWc is coupled to the input end of the inverter INV10, the drains of the transistors MP12 and MN12, the gate of the transistors MN13, and the one end of the switch SW2.

FIG. 6 illustrates a second modification example of the clamp circuit 27.

A clamp circuit 27B according to the second modification example includes the transistor MNc and the logical gate AND1.

The logical gate AND1 is an AND gate and has a first input terminal, a second input terminal, and an output terminal. The clamp control signal CLSW from the clamp control signal generator 28 is inputted to the first input terminal of the logical gate AND1. The signal CMPOUT is inputted to the second input terminal of the logical gate AND1.

In the clamp circuit 27B, an output signal from the output terminal of the logical gate AND1 is inputted to the gate of the transistor MNc. In the clamp circuit 27B, the drain of the transistor MNc is coupled to the source of the transistor MN10, the sources of the transistors MP11 and MP12, and the drain of the transistor MN13. The source of the transistor MNc is coupled to the input end of the inverter INV10, the drains of the transistors MP12 and the MN12, the gate of the transistor MN13, and the one end of the switch SW2.

FIG. 7 illustrates an example of a truth table related to an input and an output of the logical gate AND1 of each of the clamp circuits 27A and 27B.

As illustrated in FIG. 7, for example, in a case where each of a signal value of the clamp control signal CLSW and a signal value of the signal CMPOUT is "1", the clamping functions of the clamp circuits 27A and 27B are turned on, and are turned off in other cases.

FIG. 8 illustrates an example of a relationship between the AD conversion gain of the AD converter ADC and the clamping function of the clamp circuit 27.

Each of the plurality of AD converters ADC may be operable in a plurality of gain modes including at least a first gain mode (low gain mode) in which AD conversion is performed at a first AD conversion gain and a second gain mode (high gain mode) in which AD conversion is performed at a second AD conversion gain which is higher than the first AD conversion gain.

The control signal generator 28 may generate the clamp control signal CLSW on the basis of each AD conversion gain of the plurality of AD converters ADC. The control signal generator 28 may output, as the clamp control signal CLSW, a signal that disables the clamping function of the clamp circuit 27 in the first gain mode (low gain mode) and enables the clamping function of the clamp circuit 27 in the second gain mode (high gain mode), for each of respective clamp circuits 27 in the plurality of AD converters ADC.

It is to be noted that the inclination of the signal waveform of the reference signal RAMP is relatively large in the low gain mode and is relatively small in the high gain mode. In the comparison circuit 23, the inclination of the signal waveform of the reference signal RAMP to be inputted to the gate of the transistor MP11 is changeable by changing the capacitance ratio between the capacitor C1 and the capacitor C2.

Implementation Example of Imaging Device 1

Next, the implementation in the imaging device 1 is described. In the imaging device 1, the respective blocks illustrated in FIG. 1 may be formed, for example, on one semiconductor substrate or on a plurality of semiconductor substrates.

FIG. 9 illustrates an implementation example in the imaging device 1 in a case where the blocks are formed in one semiconductor substrate 200. The pixel array 11 is disposed in the semiconductor substrate 200. The drive section 12 is disposed on the left of the pixel array 11. In addition, the readout section 20 is disposed below the pixel array 11. In the readout section 20, a constant current source part 201 including the plurality of constant current sources CS, a comparison circuit part 202 including the plurality of comparators 21, a counter part 203 including a plurality of counters 24, a latch part 204 including the plurality of latches 25, and the transfer scanning part 29 are disposed in this order from the top. The reference signal generation section 13 and the imaging control section 15 are disposed on the left of this readout section 20. In addition, the signal processing section 14 is disposed on the right of the pixel array 11 and the readout section 20.

FIG. 10 illustrates an implementation example in the imaging device 1 in a case where the blocks are formed in two semiconductor substrates 211 and 212. For example, the pixel array 11 is disposed in the semiconductor substrate 211 and the readout section 20, the drive section 12, the reference signal generation section 13, the signal processing section 14, and the imaging control section 15 are disposed in the semiconductor substrate 212. The semiconductor substrates 211 and 212 are superimposed. For example, the plurality of signal lines VSL disposed in the semiconductor substrate 211 is then electrically coupled to the readout section 20 disposed in the semiconductor substrate 212, for example, through TSV (Through Silicon Via) and the plurality of control lines TGL, the plurality of control signals RSTL, and the plurality of control signals SELL disposed in the semiconductor substrate 211 are electrically coupled to the drive section 12 disposed in the semiconductor substrate 212, for example, through the TSV. The readout section 20 is disposed in the semiconductor substrate 212. The drive section 12, the reference signal generation section 13, and the imaging control section 15 are disposed on the left of the readout section 20. The signal processing section 14 is disposed on the right of the readout section 20. In the readout section 20, the constant current source part 201 including the plurality of constant current sources CS, the comparison circuit part 202 including the plurality of comparators 21, the counter part 203 including the plurality of counters 24, the latch part 204 including the plurality of latches 25, and the transfer scanning part 29 are disposed in this order from the top.

In a case where the blocks are formed in the two semiconductor substrates 211 and 212 in this way (FIG. 10), disposing the pixel array 11 mainly in the semiconductor substrate 211 makes it possible to manufacture the semiconductor substrate 211 by using a semiconductor manufacturing process specialized in the formation of pixels. That is, the semiconductor substrate 211 includes no circuit but the pixel array 11. For example, even in a case where a special manufacturing process is used to form pixels, the manufacturing process does not therefore affect circuits other than the pixel array 11. In this way, it is possible to use a semiconductor manufacturing process specialized in the formation of pixels in the imaging device 1. This makes it possible to increase the imaging characteristics in the imaging device 1.

1.2 Operation and Workings

Overview of Overall Operation

First, an overview of the overall operation in the imaging device 1 is described with reference to FIG. 1. The drive section 12 sequentially drives the plurality of pixels P in the pixel array 11 in units of the pixel lines L on the basis of an instruction from the imaging control section 15. Each of the pixels P outputs the reset voltage Vreset as the signal SIG in the P-phase period TP and outputs the pixel voltage Vpix corresponding to the amount of received light as the signal SIG in the D-phase period TD.

The reference signal generation section 13 generates the reference signal RAMP on the basis of an instruction from the imaging control section 15. The readout section 20 generates the image signal DATA0 on the basis of an instruction from the imaging control section 15 by performing AD conversion on the basis of the signal SIG supplied from the pixel array 11 through the signal line VSL. The signal processing section 14 performs predetermined signal processing on the image signal DATA0 to generate the image signal DATA on the basis of an instruction from the imaging control section 15. The imaging control section 15 supplies control signals to the drive section 12, the reference signal generation section 13, the readout section 20, and the signal processing section 14 and controls operations of these circuits, thereby controlling an operation in the imaging device 1.

Detailed Operation

In the imaging device 1, each of the plurality of pixels P accumulates electric charge corresponding to the amount of received light and outputs the pixel voltage Vpix corresponding to the amount of received light as the signal SIG. The readout section 20 then performs AD conversion on the basis of this signal SIG.

The imaging device 1 performs exposure start driving on the pixel array 11 in order from the top in the vertical direction. Specifically, the drive section 12 generates, for example, the control signals STG and SRST, thereby sequentially selecting the pixel lines L and sequentially turning on the transistors TG and RST in the pixels P in a period of time having a predetermined length. This sets the voltage of the floating diffusion FD and the voltage of the cathode of the photodiode PD to the power supply voltage VDD in each of the pixels P. In a case where the transistors TG and RST are then turned off, the photodiode PD starts to accumulate electric charge in accordance with the amount of received light. In this way, exposure periods sequentially start in the plurality of pixels P.

Next, the imaging device 1 performs readout driving on the pixel array 11 in order from the top in the vertical direction. Specifically, the drive section 12 generates the control signals STG and SRST, thereby sequentially selecting the pixel lines L. This causes each of the pixels P to output the reset voltage Vreset as the signal SIG in the P-phase period TP and output the pixel voltage Vpix as the signal SIG in the D-phase period TD. The readout section 20 performs AD conversion on the basis of this signal SIG, thereby generating the digital code CODE.

The imaging device 1 repeats such exposure start driving and such readout driving. This allows the imaging device 1 to obtain a series of captured images.

Next, the readout driving is described in detail. The following focuses on any pixel P in two different columns (columns A and B) in any pixel line L and describes operations of the pixel P of interest and the AD converter ADC coupled to the pixel P of interest.

Case where Clamping Function of Clamp Circuit 27 is Disabled

First, a case where the clamping function of the clamp circuit 27 is disabled is described as an example. That is, a case is described as an example where a signal to constantly turn off the switch SWc is outputted as the clamp control signal CLSW from the clamp control signal generator 28. FIG. 11 is a circuit diagram illustrating an example of an operation state of the comparator 21 in a case where the switch SWc of the clamp circuit 27 is turned off in the column A. FIG. 12 is a circuit diagram illustrating an example of an operation state of the comparator 21 in a case where the switch SWc of the clamp circuit 27 is turned off.

FIG. 13 is a timing waveform chart illustrating an example of a signal output state of the comparator 21 in a case where the switch SWc of the clamp circuit 27 is turned off, with a signal value being set as an absolute value. It is to be noted that FIG. 13 mainly illustrates a waveform in the P-phase period TP; however, the same also substantially applies to the D-phase period TD.

In FIG. 13, (A) illustrates the voltage waveform of the control signal AZSW that controls the switch SW1 to be turned on and off. (B) illustrates the voltage waveform of the control signal AZN that controls the switch SW2 to be turned on and off. (C) illustrates the voltage waveform of the clamp control signal CLSW that controls the switch SWc to be turned on and off. The control signal AZSW, the control signal AZN, and the clamp control signal CLSW are signals that are common to the columns A and B.

In addition, in FIG. 13, (D) illustrates the current waveform of a current Id11 flowing through the transistor MN11. (E) illustrates the current waveform of a current Id12 flowing through the transistor MN12. (F) illustrates the voltage waveform of the power supply voltage VDD1 (LDOOUT) supplied from the power supply circuit 22. (G) illustrates the voltage waveform of a voltage Vin at the coupling node Nd2 in the initial-stage circuit 101. (H) illustrates the voltage waveform of the signal Vout1 outputted from the initial-stage circuit 101. The voltage waveform of the signal Vout1 corresponds to the voltage waveform at the coupling node Nd1. (I) illustrates the voltage waveform of the signal CMPOUT finally outputted from the comparator 21. The currents and the signals illustrated in (D) to (I) of FIG. 13 are currents and signals generated inside the comparator 21 in each of the columns A and B.

In the imaging device 1, in a certain horizontal period (H), the pixel P first outputs the reset voltage Vreset by performing a reset operation and the AD converter ADC performs AD conversion on the basis of the reset voltage Vreset in the P-phase period TP. Then, the pixel P thereafter outputs the pixel voltage Vpix by performing an electric charge transfer operation and the AD converter ADC performs AD conversion on the basis of the pixel voltage Vpix in the D-phase period TD.

First, when the horizontal period H starts, the drive section 12 changes the voltage of the control signal SSEL from the low level to the high level. This turns on the transistor SEL in the pixel P and electrically couples the pixel P to the signal line VSL. In addition, the drive section 12 changes the voltage of the control signal SRST from the low level to the high level at this timing. This turns on the transistor RST in the pixel P. The voltage of the floating diffusion FD is set to the power supply voltage VDD (reset operation). The pixel P then outputs the voltage (reset voltage Vreset) corresponding to the voltage of the floating diffusion FD in this case. In this way, the voltage of the signal SIG is set to the reset voltage Vreset.

In addition, the reference signal generation section 13 sets the reference signal RAMP at a predetermined reference voltage at this timing (timing tz). In addition, the imaging control section 15 outputs, as the control signals AZSW and AZN, signals that turn on both the switches SW1 and SW2 at this timing tz. The switch SW1 is turned on, thereby changing the gate voltage (voltage Vin) of the transistor MP11 to the same voltage (AZ voltage (reference voltage)) as the drain voltage of the transistor MP11. The voltages of the capacitors C1 and C2 are set. In addition, the switch SW2 is turned on, thereby changing the gate voltage of the transistor MN12 to the same voltage as the drain voltage of the transistor MN12. The voltage of the capacitor C3 is set. This causes the voltages of the signal Vout1 outputted from the initial-stage circuit 101 and the signal Vout2 outputted from the post-stage circuit 102 to be the initial reference voltages. In this way, the comparator 21 performs an operation point setting operation. This operation point setting operation is an initialization operation of the comparator 21 and this is referred to as auto-zero operation. Hereinafter, the period of the auto-zero operation is referred to as an AZ period.

Next, the drive section 12 changes the voltage of the control signal SRST from the high level to the low level. This turns off the transistor RST in the pixel P.

Next, the imaging control section 15 outputs, as the control signals AZSW and AZN, signals that turn off both the switches SW1 and SW2 at a timing t0. This turns off both the switches SW1 and SW2 in the comparator 21 of the AD converter ADC and brings the operation point setting operation (auto-zero operation) to an end. After this, the comparator 21 operates to compare the gate voltage (voltage Vin) of the transistor MP11 and the AZ voltage (reference voltage).

Next, the reference signal generation section 13 decreases the voltage of the reference signal RAMP at a timing ta to cause the voltage of the reference signal RAMP to be lower than a predetermined reference voltage. This causes the gate voltage (voltage Vin) of the transistor MP11 to be lower than the AZ voltage (reference voltage) in the comparator 21 of the AD converter ADC. The signal Vout1 outputted from the initial-stage circuit 101 therefore has a voltage higher than the AZ voltage (reference voltage) as the voltage thereof.

Next, the AD converter ADC performs AD conversion on the basis of the reset voltage Vreset in the period from timings tp1 to tp2. Specifically, first, the reference signal generation section 13 starts to increase the voltage of the reference signal RAMP from a voltage lower than the predetermined reference voltage at a predetermined change rate at the timing tp1. Accordingly, the gate voltage (voltage Vin) of the transistor MP11 starts to increase in the comparator 21 of the AD converter ADC. In addition, the imaging control section 15 starts the generation of the clock signal CLK at this timing tp1. The counter 24 of the AD converter ADC performs a counting operation, thereby counting the pulses of this clock signal CLK.

The gate voltage (voltage Vin) of the transistor MP11 then exceeds the AZ voltage (reference voltage) at a timing tp10. That is, the gate voltage of the transistor MP11 is inverted in polarity with respect to the AZ voltage.

Next, in the timing tp2, the reference signal generation section 13 sets the voltage of the reference signal RAMP to a predetermined reference voltage upon completion of the P-phase period TP. In addition, the imaging control section 15 stops the generation of the clock signal CLK at this timing tp2.

The count value of the counter 24 in the P-phase period TP is CNTP. The latch 25 of the AD converter ADC latches the count value CNTP in the P-phase period TP. The counter 24 is then reset.

Next, the reference signal generation section 13 causes the reference signal RAMP to have a predetermined reference voltage (AZ voltage) again. This allows the auto-zero operation to be performed in a predetermined period before the start of the D-phase period TD. Next, in the D-phase period TD, the AD converter ADC performs AD conversion on the basis of the pixel voltage Vpix. The count value of the counter 24 in the D-phase period TD is CNTD. The latch 25 of the AD converter ADC latches the count value CNTD in the D-phase period TD. The counter 24 is then reset.

Next, the reference signal generation section 13 sets the voltage of the reference signal RAMP to a predetermined reference voltage upon completion of the D-phase period TD. In addition, the imaging control section 15 stops the generation of the clock signal CLK at this timing. The drive section 12 then changes the voltage of the control signal SSEL from the high level to the low level at this timing. This turns off the transistor SEL in the pixel P and electrically uncouples the pixel P from the signal line VSL.

The latch 25 of the AD converter ADC then generates the digital code CODE corresponding to a difference (CNTD-CNTP) between the count value CNTP obtained by the counter 24 in the P-phase period TP and the count value CNTD obtained by the counter 24 in the D-phase period TD.

Description of Signal Dispersion Between Columns

Here, the currents and signals illustrated in (D) to (I) of FIG. 13 are currents and signals generated inside the comparator 21 in each of the columns A and B; however, dispersion occurs in these currents and signals between the columns. The following describes this dispersion. It is to be noted that the same also substantially applies to the D-phase period TD.

In the period of the auto-zero operation (AZ period), the current Id flowing through the transistor MN10 is the sum of the current Id11 (current value Id1) flowing through the transistor MN11 and the current Id12 (current value Id2) flowing through the transistor MN12 (current values Id1+Id2) in the column A (FIGS. 11 and (D) and (E) of FIG. 13). In the P-phase period TP (AD period), the current Id flowing through the transistor MN10 is the same as the current Id11 (current value Id1) flowing through the transistor MN11 in the column A, because the current Id12 flowing through the transistor MN12 is zero (FIGS. 11 and (D) and (E) of FIG. 13). That is, the switch of the clamp circuit 27 is turned off in the P-phase period TP, thereby generating a difference in the current Id between the AZ period and the P-phase period TP.

Meanwhile, in the column B, as compared with the column A, there occurs dispersion ΔId1 in the current value of the current Id11 flowing through the transistor MN11, and there occurs dispersion ΔId2 in the current value of the current Id12 flowing through transistor MN12 (FIGS. 12 and (D) and (E) of FIG. 13). Thus, in the column B, in the period of the auto-zero operation (AZ period), the current value of the current Id flowing through the transistor MN10 is Id1+Id2+ΔId1+ΔId2. In addition, in the P-phase period TP (AD period), in the column B, the current Id flowing through the transistor MN10 is Id1+ΔId1, because the current Id12 flowing through the transistor MN12 is zero. That is, the switch of the clamp circuit 27 is turned off in the P-phase period TP, thereby generating a difference in the current Id between the AZ period and the P-phase period TP.

In addition, dispersion also occurs in the power supply voltage VDD1, the voltage Vin, and the signal Vout1 between the column A and the column B ((F) to (H) of FIG. 13).

The above-described dispersions in the currents and the signals between the columns A and B include those in a DC component and an AC component. The dispersion in the DC component is excluded by noise reduction processing by means of a CDS method. Thus, next, the dispersion in the DC component between the columns is excluded, and a fluctuation amount based on an AZ level is considered. The dispersion in the AC component corresponds to dispersion in the count value CNTP in the P-phase period TP.

FIG. 14 is a timing waveform chart illustrating an example of a signal output state of the comparator 21 in a case where the switch SWc of the clamp circuit 27 is turned off, with a signal value being set as a fluctuation component from the AZ level. (A) to (I) of FIG. 14 illustrate waveforms of signals or currents similar to those in (A) to (I) of FIG. 13.

In a case of considering a fluctuation amount based on the AZ level, in the P-phase period TP, dispersion ΔLDOOUT occurs in the power supply voltage VDD1 (LDOUT) supplied from the power supply circuit 22 between the column A and the column B. Thus, dispersion ΔVout1 occurs in the inversion time of the signal Vout1 outputted from the initial-stage circuit 101, and dispersion occurs in the inversion time of the signal CMPOUT finally outputted from the comparator 21. This causes dispersion to occur in the count value CNTP in the P-phase period TP between the column A and the column B.

In Case where Clamping Function of Clamp Circuit 27 is Enabled

Next, a case where the clamping function of the clamp circuit 27 is enabled is described as an example. That is, a case is described, as an example, where a signal that turns on the switch SWc at a predetermined timing is outputted as the clamp control signal CLSW from the clamp control signal generator 28.

FIG. 15 is a circuit diagram illustrating an example of an operation state of the comparator 21 in a case where the switch SWc of the clamp circuit 27 is turned on in the column A. FIG. 16 is a circuit diagram illustrating an example of an operation state of the comparator 21 in a case where the switch SWc of the clamp circuit 27 is turned on in the column B.

FIG. 17 is a timing waveform chart illustrating an example of a signal output state of the comparator 21 in a case where the switch SWc of the clamp circuit 27 is turned on at a predetermined timing, with a signal value being set as an absolute value. (A) to (I) of FIG. 17 illustrate waveforms of signals or currents similar to those in (A) to (I) of FIG. 13.

In (A) to (I) of FIG. 17, the switch SWc of the clamp circuit 27 is turned off in the AZ period in the comparator 21, and thus the waveforms of the signals or the currents are similar to those in (A) to (I) of FIG. 13.

The control signal generator 28 outputs, as the clamp control signal CLSW, a signal that turns on the switch of the clamp circuit 27 in synchronization with a timing of completion of the AZ period. Thus, in the P-phase period TP (AD period), the switch of the clamp circuit 27 is turned on.

The switch of the clamp circuit 27 is turned on, thereby causing the current Id12 of the current value Id2 to flow through the transistor MN12 similarly to the AZ period, also in the P-phase period TP (AD period) in the column A (FIGS. 15 and (D) and (E) of FIG. 17). Therefore, in the column A, the current value of the current Id flowing through the transistor MN10 is Id1+Id2 in both of the AZ period and the P-phase period TP. That is, the switch of the clamp circuit 27 is turned on, thereby causing the current Id to be the same between the AZ period and the P-phase period TP.

Meanwhile, in the column B, as compared with the column A, there occurs dispersion ΔId1 in the current value of the current Id11 flowing through the transistor MN11, and there occurs dispersion ΔId2 in the current value of the current Id12 flowing through transistor MN12 (FIGS. 16 and (D) and (E) of FIG. 17). Thus, in the column B, the current value of the current Id flowing through the transistor MN10 is Id1+Id2+ΔId1+ΔId2 in both of the AZ period and the P-phase period TP. That is, the switch of the clamp circuit 27 is turned on, thereby causing the current Id to be the same between the AZ period and the P-phase period TP.

In addition, dispersion also occurs in the power supply voltage VDD1, the voltage Vin, and the signal Vout1 between the columns A and B ((F) to (H) of FIG. 17).

The above-described dispersions in the currents and the signals between the columns A and B include those in a DC component and an AC component. The dispersion in the DC component is excluded by noise reduction processing by means of a CDS method. Thus, next, the dispersion in the DC component between the columns is excluded, and a fluctuation amount based on the AZ level is considered. The dispersion in the AC component corresponds to dispersion in the count value CNTP in the P-phase period TP.

FIG. 18 is a timing waveform chart illustrating an example of a signal output state of the comparator 21 in a case where the switch SWc of the clamp circuit 27 is turned on at a predetermined timing, with a signal value being set as a fluctuation component from the AZ level. (A) to (I) of FIG. 18 illustrate waveforms of signals or currents similar to those in (A) to (I) of FIG. 14.

In a case of considering a fluctuation amount based on the AZ level, the switch of the clamp circuit 27 is turned on, thereby causing no dispersion in the currents Id1 and Id2 between the column A and the column B in both of the AZ period and the P-phase period TP. In addition, in a case of considering the fluctuation amount based on the AZ level, there is no dispersion in the power supply voltage VDD1, the voltage Vin, the signal Vout1, and the signal CMPOUT between the column A and the column B in both of the AZ period and the P-phase period TP. Thus, dispersion does not occur between the column A and the column B or is reduced in the count value CNTP in the P-phase period TP.

In addition, in a case where the clamping function of the clamp circuit 27 is enabled, it is possible to increase the distribution width of the signal CMPOUT in the P-phase period TP. It is to be noted that the dispersion in the DC component of the power supply voltage VDD1 between the columns A and B is cancelled each other by noise reduction processing by means of a CDS method. This effect is particularly large in a case where the AD conversion gain is a low gain. Conversely, in a case where the AD conversion gain is a high gain, the effect is small. Therefore, particularly, in a case where the AD conversion gain is a high gain, it is desirable that the clamping function of the clamp circuit 27 be enabled.

1.3 Effects

As described above, according to the imaging device 1 of the embodiment, the voltage of the signal Vout2 outputted from the post-stage circuit 102 is able to be selectively clamped by the clamp circuit 27 in each comparator 21 of the plurality of AD converters ADC, thus making it possible to achieve an improvement in image quality.

It is to be noted that the effects described herein are merely illustrative and not limiting, and there may be other effects as well. The same applies to effects of the following modification examples and other embodiments.

1.4 MODIFICATION EXAMPLES

Modification Example 1

FIGS. 19A and 19B each schematically illustrate a configuration example of a comparator 21A according to Modification Example 1. It is to be noted that FIG. 19B illustrates the configuration example of the comparator 21A in a partially simplified manner.

The comparator 21 is not limited to the configuration illustrated in FIGS. 4A and 4B, but may be configured as with the comparator 21A according to Modification Example 1 illustrated in FIGS. 19A and 19B. In the comparator 21A according to the modification example 1, the ground voltage VSS0 is supplied from the imaging control section 15 through a ground line VSSL. This comparator 21A includes a power supply circuit 22A and a comparison circuit 23A. In addition, the comparator 21A includes the inverter INV10, the clamp circuit 27, and the clamp control signal generator 28.

As illustrated in FIG. 19B, the power supply circuit 22A includes, for example, a transistor MP20.

The comparison circuit 23A includes the initial-stage circuit 101 and the post-stage circuit 102. The initial-stage circuit 101 is able to output the signal Vout1 corresponding to a comparison operation based on the signal SIG and the reference signal RAMP. The post-stage circuit 102 is coupled to the initial-stage circuit 101 through the coupling node Nd1. The post-stage circuit 102 is able to output the signal Vout2 corresponding to the signal Vout1 outputted from the initial-stage circuit 101 through the coupling node Nd1.

In the comparison circuit 23A, the initial-stage circuit 101 includes capacitors C11 and C12, a transistor MN21, a constant current source 61A, and a switch SW11. As illustrated in FIG. 19B, the constant current source 61A includes, for example, a transistor MP21. The transistors MP20 and MP21 are each a P-type MOS transistor, and the transistor MN21 is an N-type MOS transistor.

Hereinafter, a configuration example illustrated in FIG. 19B is described as an example; however, the configurations of the power supply circuit 22 and the constant current source 61A are not limited to the configuration example illustrated in FIG. 19B.

In the comparison circuit 23A, although not illustrated, the post-stage circuit 102 includes, for example, a second transistor including an N-type MOS transistor and a second load transistor including a P-type MOS transistor.

The power supply circuit 22A is provided for each comparison circuit 23A of the plurality of AD converters ADC, and supplies a ground voltage VSS1 as the power supply voltage common to the initial-stage circuit 101 and the post-stage circuit 102. In the power supply circuit 22A, the gate of the transistor MP20 is supplied with the bias voltage VB1, the drain thereof is coupled to the ground line VSSL, and the source thereof is coupled to the source of the transistor MN21 and the source of the unillustrated second transistor in the post-stage circuit 102. The transistor MP20 operates as a so-called source follower, thereby outputting the ground voltage VSS1 from the source. In addition, the source of the transistor MN20 is coupled to the one end of the switch SWc in the clamp circuit 27.

Each of the capacitors C11 and C12 has one end and the other end. The one end of the capacitor C11 is coupled to the reference signal generation section 13 and the other end thereof is coupled to the other end of the capacitor C12, the gate of the transistor MN21, and one end of the switch SW11. This one end of the capacitor C11 is supplied with the reference signal RAMP generated by the reference signal generation section 13. The one end of the capacitor C12 is coupled to the signal line VSL and the other end thereof is coupled to the other end of the capacitor C11, the gate of the transistor MN21, and the one end of the switch SW11. This one end of the capacitor C12 is supplied with the signal SIG generated by the pixel P.

At least one of the capacitor C11 or the capacitor C12 may have a variable capacitance. Thus, the capacitance ratio between the capacitor C11 and the capacitor C12 may be changeable.

The gate of the transistor MN21 is coupled to the other ends of the capacitors C11 and C12 and the one end of the switch SW11 through the coupling node Nd2. The signal SIG is inputted to the gate of the transistor MN21 through the capacitor C12. In addition, the reference signal RAMP is inputted to the gate of the transistor MN21 through the capacitor C11.

The drain of the transistor MN21 is coupled to the drain of the transistor MP21, the gate of the transistor MN22, and the other end of the switch SW11 and the source thereof is coupled to the transistor MP20 and the source of the unillustrated second load transistor in the post-stage circuit 102.

The gate of the transistor MP21 is supplied with the bias voltage VB2, the drain thereof is coupled to the drain of the transistor MN21, the gate of the transistor MN22, and the other end of the switch SW11, and the source thereof is supplied with the power supply voltage VDD0. The transistor MP21 is a load transistor serving as a load of the transistor MN21. The transistor MP21 operates as a constant current source. The switch SW11 is configured to be turned on and off on the basis of the control signal AZSW. The one end of the switch SW11 is coupled to the other ends of the capacitors C11 and C12 and the gate of the transistor MN21. The other end of the switch SW11 is coupled to the drains of the transistors MN21 and MP21 and the gate of the unillustrated second transistor in the post-stage circuit 102.

Here, the transistor MN21 corresponds to a specific example of the "first transistor" in the technology according to the present disclosure. The capacitor C11 corresponds to a specific example of the "first capacitor" in the technology according to the present disclosure. The capacitor C12 corresponds to a specific example of the "second capacitor" in the technology according to the present disclosure. The transistor MP21 corresponds to a specific example of the "first load transistor" in the technology according to the present disclosure.

The clamp circuit 27 is provided for each comparison circuit 23A of the plurality of AD converters ADC. The switch SWc of the clamp circuit 27 is controlled to be turned on and off on the basis of the clamp control signal CLSW. The switch SWc is turned on, thereby enabling the clamp circuit 27 to selectively clamp the voltage of the signal Vout2 outputted from the post-stage circuit 102.

The gate of the transistor MNc in the clamp circuit 27 is coupled to the output end of the inverter INV10, and the signal CMPOUT is inputted thereto. The source of the transistor MNc is coupled to the input end of the inverter INV10 and the drains of the unillustrated second transistor and second load transistor in the post-stage circuit 102. The drain of the transistor MNc is coupled to the other end of the switch SWc.

The one end of the switch SWc in the clamp circuit 27 is coupled to the source of the transistor MP20, the source of the transistors MN21, and the source of the unillustrated second transistor in the post-stage circuit 102. The other end of the switch SWc is coupled to the drain of the transistor MNc in the clamp circuit 27.

Also in the comparator 21A according to Modification Example 1, the switch SWc is appropriately controlled to be turned on and off similarly to the comparator 21 illustrated in FIGS. 4A and 4B, thereby making it possible to achieve an improvement in image quality. In addition, also in the comparator 21A according to Modification Example 1, the configuration of the clamp circuit 27 may be the configuration of the clamp circuit 27A illustrated in FIG. 5 or the clamp circuit 27B illustrated in FIG. 6.

Other configurations and operations may be substantially similar to those of the comparator 21 illustrated in FIGS. 4A and 4B.

Modification Example 2

Configuration

FIG. 20 schematically illustrates a configuration example of a comparator 21B according to Modification Example 2.

The comparator 21B according to Modification Example 2 includes a comparison circuit 23B instead of the comparison circuit 23 in the comparator 21 illustrated in FIGS. 4A and 4B. The comparison circuit 23B includes capacitors Cg1, Cg2, Cg3, Cg4, and Cg5, as the capacitor C1 and the capacitor C2 in the comparison circuit 23 illustrated in FIGS. 4A and 4B. In addition, the comparison circuit 23B includes switches SWg1, SWg2, SWg3, SWg4, and SWg5. The capacitors Cg1, Cg2, Cg3, Cg4, and Cg5 are able to be coupled in parallel through the switches SWg1, SWg2, SWg3, SWg4, and SWg5. This allows at least one of the capacitor C1 or the capacitor C2 to have a variable capacitance and the capacitance ratio between the capacitor C1 and the capacitor C2 to be changeable. It is to be noted that the number of the capacitors included in the capacitor C1 and the capacitor C2 is not limited to this example.

One end of the capacitor Cg1 is supplied with the signal SIG generated by the pixel P. One end of the capacitor Cg5 is supplied with the reference signal RAMP generated by the reference signal generation section 13. One end of the switch SWg1 is coupled to the one end of the capacitor Cg1. The other end of the switch SWg1 is coupled to one end of the capacitor Cg2 and one end of the switch SWg2. The other end of the switch SWg2 is coupled to one end of the capacitor Cg3 and one end of the switch SWg3. The other end of the switch SWg3 is coupled to one end of the capacitor Cg4 and one end of the switch SWg4. The other end of the switch SWg5 is coupled to one end of the capacitor Cg5. The other ends of the capacitors Cg1, Cg2, Cg3, Cg4, and Cg5 are each coupled to the gate of the transistor MP11 and the one end of the switch SW1.

The capacitors Cg1, Cg2, Cg3, Cg4, and Cg5 may be, for example, elements of the same capacitance. A switch setting signal GASW controls the switches SWg1, SWg2, SWg3, SWg4, and SWg5 to be turned on and off. At least one of the switches SWg1, SWg2, SWg3, SWg4, and SWg5 is controlled to be turned off. This allows the capacitance ratio between the capacitor C1 and the capacitor C2 to be changeable. In the comparison circuit 23B, the inclination of the signal waveform of the reference signal RAMP to be inputted to the gate of the transistor MP11 is changeable by changing the capacitance ratio between the capacitor C1 and the capacitor C2. This makes it possible to change the signal waveform of the reference signal RAMP into a waveform corresponding to the AD conversion gain.

FIG. 21 illustrates a configuration example of a peripheral part of the readout section 20 in the imaging device 1 according to Modification Example 2.

The imaging device 1 according to Modification Example 2 further includes a gain setting control section 81 and a register 82 in addition to the configuration example illustrated in FIG. 3.

Here, the gain setting control section 81 corresponds to a specific example of a "setting control section" in the technology according to the present disclosure. The register 82 corresponds to a specific example of a "setting storage section" in the technology according to the present disclosure.

In the imaging device 1 according to Modification Example 2, the signal processing section 14 may generate illuminance data DATA1 on the basis of the image signal DATA0 outputted from each of the plurality of AD converters ADC, and then may generate the image signal DATA as image data. The signal processing section 14 may acquire illuminance on the basis of the image signal DATA0 based on the signal SIG from the pixel P of all or a part of the plurality of pixels P in the pixel array 11, and may output the illuminance data DATA1 to the gain setting control section 81. The generation operation of the illuminance data DATA1 by the signal processing section 14 may be configured to obtain a statistic of a predetermined pixel signal, e.g., a mean, a median, or a mode, or any linear or nonlinear operation may be performed before and after obtaining the statistic.

It is to be noted that the pixel array 11 may include a pixel dedicated to measurement of illuminance. In addition, the pixel array 11 may include a pixel configured to be switched between being used for imaging and being used for measurement of illuminance.

The register 82 may store setting data GADT for setting of the capacitance ratio between the capacitor C1 and the capacitor C2.

The gain setting control section 81 may generate the switch setting signal GASW on the basis of at least one of the illuminance data DATA1 from the signal processing section 14 or the setting data GADT from the register 82, and may control the capacitance ratio between the capacitor C1 and the capacitor C2.

A correspondence relationship between the illuminance data DATA1 as well as the setting data GADT and the switch setting signal GASW may be implemented by arithmetic hardware, arithmetic software, a look-up table, or the like.

Operation

FIG. 22 schematically illustrates an example of illuminance measurement processing in the imaging device 1 according to Modification Example 2. FIG. 23 schematically illustrates an example of imaging processing in the imaging device 1 according to Modification Example 2. Here, an example of a readout sequence of one frame is illustrated. In addition, a case of a rolling shutter is described as an example.

The drive section 12 sequentially drives the plurality of pixels P in the pixel array 11 in units of the pixel lines L on the basis of an instruction from the imaging control section 15. First, the drive section 12 selects one pixel line L (step S110). Next, the drive section 12 drives the pixel array 11 to start exposure and to read out the selected one pixel line L (step S111). Next, the AD converter ADC performs A/D conversion on the signal SIG from the pixel P of the one pixel line L (step S112). Next, the AD converter ADC outputs the image signal DATA0 for the one pixel line L (step S113).

Next, the imaging control section 15 determines whether or not the pixel array 11 has been driven to the final line (step S114). In a case where determination is made that the driving has not been performed to the final line (step S114: N), the imaging control section 15 returns to the processing in step S110. In a case where the imaging control section 15 determines that the driving has been performed to the final line (step S114: Y), the signal processing section 14 generates the illuminance data DATA1 on the basis of the image signal DATA0 outputted from the AD converter ADC (step S115). Next, the signal processing section 14 outputs the illuminance data DATA1 to the gain setting control section 81 (step S116).

Next, the imaging control section 15 performs the imaging processing in FIG. 23. The drive section 12 sequentially drives the plurality of pixels P in the pixel array 11 in units of the pixel lines L on the basis of an instruction from the imaging control section 15. First, the drive section 12 selects one pixel line L (step S120). Next, the drive section 12 drives the pixel array 11 to start exposure and to read out the selected one pixel line L (step S121). Next, the AD converter ADC performs A/D conversion on the signal SIG from the pixel P of the one pixel line L (step S122). Next, the AD converter ADC outputs the image signal DATA0 for the one pixel line L (step S123).

Next, the imaging control section 15 determines whether or not the pixel array 11 has been driven to the final line (step S124). In a case where determination is made that the driving has not been performed to the final line (step S124: N), the imaging control section 15 returns to processing in step S120. In a case where the imaging control section 15 determines that the driving has been performed to the final line (step S124: Y), the signal processing section 14 generates the image signal DATA as image data on the basis of the image signal DATA0 outputted from the AD converter ADC (step S125). Next, the signal processing section 14 outputs the image signal DATA as image data (step S126).

Effects

According to the imaging device 1 of Modification Example 2, imaging at an optimum gain is possible for each frame. It is to be noted that, in the imaging device 1 according to Modification Example 2, exposure for acquiring illuminance may be used also in the exposure for imaging to generate the illuminance data DATA1 in accordance with the generation of image data. In addition, the exposure sequence for imaging and the exposure sequence for acquiring illuminance may not be alternating. For example, the exposure sequence for acquiring illuminance may be performed once for every few frames. In addition, as for the generation operation of the illuminance data DATA1 in the signal processing section 14, a part or all of the portion and the gain setting control section 81 may be configured by a chip different from that of another circuit.

The other configuration and operation may be substantially similar to those of the imaging device 1 according to the embodiment described above.

2. Usage Example of Imaging Device

FIG. 24 illustrates a usage example in the imaging device 1 according to the embodiment described above. For example, the imaging device 1 described above is usable in a variety of cases of sensing light such as visible light, infrared light, ultraviolet light, and X-ray as follows.

- Apparatuses that shoot images for viewing such as digital cameras or mobile apparatuses each having a camera function
- Apparatuses for traffic use such as onboard sensors that shoot images of the front, back, surroundings, inside, and so on of an automobile for safe driving such as automatic stop and for recognizing a driver's state, monitoring cameras that monitor traveling vehicles and roads, or distance measurement sensors that measure vehicle-to-vehicle distance
- Apparatuses for use in home electrical appliances such as televisions, refrigerators, or air-conditioners to shoot images of a user's gesture and bring the appliances into operation in accordance with the gesture
- Apparatuses for medical treatment and health care use such as endoscopes or apparatuses that shoot images of blood vessels by receiving infrared light
- Apparatuses for security use such as monitoring cameras for crime prevention or cameras for individual authentication
- Apparatuses for beauty care use such as skin measurement apparatuses that shoot images of skin or microscopes that shoot images of scalp
- Apparatuses for sports use such as action cameras or wearable cameras for sports applications and the like
- Apparatuses for agricultural use such as cameras for monitoring the conditions of fields and crops

3. Example of Practical Application to Mobile Body

The technology (the present technology) according to the present disclosure is applicable to a variety of products. For example, the technology according to the present disclosure may be achieved as a device mounted on any type of mobile body such as an automobile, an electric vehicle, a hybrid electric vehicle, a motorcycle, a bicycle, a personal mobility, an aircraft, a drone, a vessel, or a robot.

FIG. 25 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 25, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 25, an audio speaker 12061, a display section 12062, and an instrument panel 12063 are illustrated as the output device. The display section 12062 may, for example, include at least one of an on-board display and a head-up display.

FIG. 26 is a diagram depicting an example of the installation position of the imaging section 12031.

In FIG. 26, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 26 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The example of the vehicle control system to which the technology according to the present disclosure may be applied has been described above. The technology according to the present disclosure may be applied to the imaging section 12031 among the components described above. This makes it possible in the vehicle control system 12000 to increase the image quality of a captured image. As a result, the vehicle control system 12000 allows for an increase in the accuracy of a collision avoidance or collision mitigation function for the vehicle, a following driving function based on vehicle-to-vehicle distance, a vehicle speed maintaining driving function, a warning function of collision of the vehicle, a warning function of deviation of the vehicle from a lane, and the like.

4. Example of Practical Application to Distance Measuring Device

Next, an example of a case where the present technology is applied to a distance measuring device is described in detail.

FIG. 27 illustrates a configuration example of a distance measuring device 900 according to the present practical application example. The distance measuring device 900 is configured to measure the distance to a measurement object OBJ in an indirect method. The distance measuring device 900 includes a light-emitting unit 901, an optical system 902, a photodetection unit 910, and a control unit 903.

The light-emitting unit 901 is configured to emit a light pulse L0 toward the measurement object OBJ. The light-emitting unit 901 emits the light pulse L0 on the basis of an instruction from the control unit 903 by performing a light emission operation of alternately repeating the emission and non-emission of light. The light-emitting unit 901 includes, for example, a light source that emits infrared light. This light source includes, for example, a laser light source, an LED (Light Emitting Diode), or the like.

The optical system 902 includes a lens that forms an image on a light receiving surface S of the photodetection unit 910. A light pulse (reflection light pulse L1) emitted from the light-emitting unit 901 and reflected by the measurement object OBJ enters this optical system 902.

The photodetection unit 910 is configured to detect light to generate a distance image PIC on the basis of an instruction from the control unit 903. Each of a plurality of pixel values included in the distance image PIC indicates a value about distance D to the measurement object OBJ. The photodetection unit 910 then outputs the generated distance image PIC as the image signal DATA.

The control unit 903 is configured to supply the light-emitting unit 901 and the photodetection unit 910 with control signals and control operations of these light-emitting unit 901 and photodetection unit 910, thereby controlling an operation of the distance measuring device 900.

FIG. 28 illustrates a configuration example of the photodetection unit 910. The photodetection unit 910 includes a pixel array 911, a drive section 912, a reference signal generation section 913, a readout section 919, a signal processing section 914, and an imaging control section 915. For example, the pixel array 911, the drive section 912, the reference signal generation section 913, the readout section 919, the signal processing section 914, and the imaging control section 915 may be formed in one semiconductor substrate. In addition, the pixel array 911 may be formed in one semiconductor substrate and the drive section 912, the reference signal generation section 913, the readout section 919, the signal processing section 914, and the imaging control section 915 may be formed in another semiconductor substrate. These two semiconductor substrates may be superimposed.

The pixel array 911 includes a plurality of pixels 920 disposed in a matrix. Each of the pixels 920 is configured to generate the pixel voltage Vpix corresponding to the amount of received light.

FIG. 29 illustrates a configuration example of the pixel 920. The pixel array 911 includes a plurality of control lines 931A, a plurality of control lines 931B, a plurality of control lines 932A, the plurality of control lines 932A, a plurality of control lines 933, a plurality of signal lines 939A, and a plurality of signal lines 939B.

The pixel 920 includes a photodiode 921, floating diffusions 923A and 923B, and transistors 922A, 922B, 924A, 924B, 925A, 925B, 926A, and 926B. A circuit including the photodiode 921, the floating diffusion 923A, and the transistors 922A, 924A, 925A, and 926A is also referred to as a tap A. In addition, a circuit including the photodiode 921, the floating diffusion 923B, and the transistors 922B, 924B, 925B, and 926B is also referred to as a tap B.

In the tap A, the gate of the transistor 922A is coupled to the control line 931A, the source thereof is coupled to the photodiode 921, and the drain thereof is coupled to the floating diffusion 923A. The floating diffusion 923A is configured to accumulate electric charge supplied from the photodiode 921 through the transistor 922A. The gate of the transistor 924A is coupled to the control line 932A, the drain thereof is supplied with the power supply voltage VDD, and the source thereof is coupled to the floating diffusion 923A. The gate of the transistor 925A is coupled to the floating diffusion 923A, the drain thereof is supplied with the power supply voltage VDD, and the source thereof is coupled to the drain of the transistor 926A. The gate of the transistor 926A is coupled to the control line 933, the drain thereof is coupled to the source of the transistor 925A, and the source thereof is coupled to the signal line 939A. The tap A has been described above as an example and the same applies to the tap B.

According to this configuration, the transistor 924A is turned on to reset the floating diffusion 923A and the transistor 924B is turned on to reset the floating diffusion 923B in the pixel 920. Any one of the transistor 922A or 922B is then alternately turned on to selectively accumulate electric charge generated by the photodiode 921 in the floating diffusion 923A and the floating diffusion 923B. The transistors 926A and 926B are then turned on to cause the pixel 920 to output a pixel signal corresponding to the amount of electric charge accumulated in the floating diffusion 923A to the signal line 939A and output a pixel signal corresponding to the amount of electric charge accumulated in the floating diffusion 923B to the signal line 939B.

The drive section 912 (FIG. 28) is configured to sequentially drive the plurality of pixels 920 in the pixel array 911 in units of the pixel lines L on the basis of an instruction from the imaging control section 915. The reference signal generation section 913 is configured to generate the reference signal RAMP on the basis of an instruction from the imaging control section 915. The readout section 919 is configured to generate the image signal DATA0 on the basis of an instruction from the imaging control section 915 by performing AD conversion on the basis of pixel signals supplied from the pixel array 911 through the signal lines 939A and 939B. The signal processing section 914 is configured to perform predetermined signal processing on the image signal DATA0 to generate the distance image PIC on the basis of an instruction from the imaging control section 915 and output the image signal DATA including this distance image PIC. The imaging control section 915 is configured to supply control signals to the drive section 912, the reference signal generation section 913, the readout section 919, and the signal processing section 914 and control operations of these circuits, thereby controlling an operation of the photodetection unit 910.

FIGS. 30A and 30B illustrate an operation examples of the distance measuring device 900. (A) of FIG. 30A illustrates the waveform of the light pulse L0 to be emitted from the light-emitting unit 901 and (B) of FIG. 30B illustrates the waveform of the reflection light pulse L1 to be detected by the photodetection unit 910.

The light-emitting unit 901 emits the light pulse L0 having a pulse waveform with a duty ratio of 50% on the basis of an instruction from the control unit 903 FIG. 30A). This light pulse L0 travels toward the measurement object OBJ. This light pulse L0 is then reflected by the measurement object OBJ and the reflected reflection light pulse L1 travels toward the photodetection unit 910. The pixel 920 of this photodetection unit 910 then detects this reflection light pulse L1 FIG. 30B). The reflection light pulse L1 detected by the pixel 920 has a waveform obtained by delaying the waveform of the light pulse L0 illustrated in FIG. 30A by a delay time DL. This delay time DL is a time in which light travels in the order of the light-emitting unit 901, the measurement object OBJ, and the photodetection unit 910. The delay time DL corresponds to the flight time of light. This flight time of light corresponds to the distance between the distance measuring device 900 and the measurement object OBJ.

In the indirect method, the floating diffusion 923A of the pixel 920 accumulates signal charge Q1 corresponding to the amount of light received by the photodiode 921 in a period 941 in which the light-emitting unit 901 emits light. The floating diffusion 923B of the pixel 920 accumulates signal charge Q2 corresponding to the amount of light received by the photodiode 921 in a period 942 in which the light-emitting unit 901 emits no light. The signal processing section 914 then obtains the electric charge ratio between the signal charge Q1 and the signal charge Q2. The photodiode 921 detects light in periods 951 and 952. The electric charge amount of the signal charge Q1 is therefore proportional to the length of the period 951 and the electric charge amount of the signal charge Q2 is proportional to the length of the period 952. In a case where the delay time DL is short, the signal charge Q1 is increased and the signal charge Q2 is decreased. In a case where the delay time DL is long, the signal charge Q1 is decreased and the signal charge Q2 are increased. In this way, the electric charge ratio between the signal charge Q1 and the signal charge Q2 is changed depending on the delay time DL. In the indirect method, obtaining this electric charge ratio makes it possible to obtain the delay time DL with high accuracy, for example. As a result, it is possible to measure the distance to the measurement object OBJ with high accuracy. The present technology is applicable to this readout section 919. This makes it possible to increase the image quality of a distance image.

The example of the distance measuring device 900 to which the technology according to the present disclosure may be applied has been described above. The technology according to the present disclosure may be applied to such a distance measuring device 900. This makes it possible to increase the image quality of a distance image in the distance measuring device 900.

5. Other Embodiments

The technology according to the present disclosure is not limited to the description of the embodiment and the modification examples described above, but may be modified and carried out in a variety of ways.

For example, in the embodiment described above, the pixel P is configured as illustrated in FIG. 2, but this is not limitative. It is possible to use pixels having various configurations.

For example, the present technology may also have configurations as follows.

According to the present technology having the following configurations, in each comparison circuit of a plurality of AD converters, a voltage of a second output signal from a second-stage amplifier circuit is able to be selectively clamped by a clamp circuit, thus making it possible to achieve an improvement in image quality.

(1)
A photodetection device including:
a plurality of pixels arranged in a matrix, the plurality of pixels each being configured to generate a pixel signal;
a reference signal generation section configured to generate a reference signal;
a plurality of AD converters provided for respective pixel columns of the plurality of pixels, and including a comparison circuit, the comparison circuit including
a first-stage amplifier circuit configured to output a first output signal corresponding to a comparison operation based on the pixel signal and the reference signal, and
a second-stage amplifier circuit coupled to the first-stage amplifier circuit, and being configured to output a second output signal corresponding to the first output signal outputted from the first-stage amplifier circuit, the plurality of AD converters performing AD conversion on the pixel signal on a basis of the second output signal;
a plurality of clamp circuits provided for the comparison circuit of each of the plurality of AD converters, and each including a switch that is controlled on and off on a basis of a clamp control signal, the plurality of clamp circuits being configured to selectively clamp a voltage of the second output signal from the second-stage amplifier circuit by turning on the switch; and
a control signal generator that generates the clamp control signal for each of the plurality of clamp circuits.

(2)
The photodetection device according to (1), further including a power supply circuit provided for the comparison circuit of each of the plurality of AD converters, the power supply circuit supplying a power supply voltage that is common to the first-stage amplifier circuit and the second-stage amplifier circuit.

(3)

The photodetection device according to (1) or (2), in which the control signal generator generates the clamp control signal on a basis of an AD conversion gain of each of the plurality of AD converters.

(4)

The photodetection device according to (3), in which
  each of the plurality of AD converters is operable in a plurality of gain modes including at least a first gain mode in which AD conversion is performed at a first AD conversion gain and a second gain mode in which AD conversion is performed at a second AD conversion gain higher than the first AD conversion gain, and
  the control signal generator outputs, to each of the plurality of clamp circuits, a signal, as the clamp control signal, that disables a clamping function of the clamp circuit in the first gain mode and that enables the clamping function of the clamp circuit in the second gain mode.

(5)

The photodetection device according to any one of (1) to (4), in which
  each of the plurality of pixels outputs, as the pixel signal, a signal to have a reset voltage in a first period, and then outputs a signal to have a pixel voltage corresponding to an amount of received light in a second period,
  the reference signal generation section generates a reference signal to have a predetermined reference voltage in a predetermined period before a start of the first period and in a predetermined period before a start of the second period, and
  the control signal generator generates, as the clamp control signal, a signal that turns on the switch of the clamp circuit in synchronization with a timing of completion of the predetermined period.

(6)

The photodetection device according to any one of (1) to (5), in which
  the first-stage amplifier circuit includes
    a first capacitor to which the reference signal is inputted,
    a second capacitor to which the pixel signal is inputted, and
    a first transistor including a gate, a drain, and a source, in which the reference signal is inputted to the gate through the first capacitor, and the pixel signal is inputted to the gate through the second capacitor.

(7)

The photodetection device according to (6), in which the first-stage amplifier circuit further includes a first load transistor coupled to the drain of the first transistor.

(8)

The photodetection device according to (6) or (7), in which
  at least one of the first capacitor or the second capacitor has a variable capacitance, and
  a capacitance ratio between the first capacitor and the second capacitor is changeable.

(9)

The photodetection device according to (8), further including a setting control section that controls the capacitance ratio between the first capacitor and the second capacitor on a basis of illuminance data.

(10)

The photodetection device according to (9), further including a signal processing section that generates image data after generation of the illuminance data based on a signal outputted from each of the plurality of AD converters.

(11)

The photodetection device according to (9) or (10), further including a setting storage section that stores setting data for setting of the capacitance ratio between the first capacitor and the second capacitor, in which
  the setting control section generates a control signal that controls the capacitance ratio between the first capacitor and the second capacitor on a basis of the illuminance data and the setting data.

(12)

The photodetection device according to any one of (1) to (11), in which the second-stage amplifier circuit includes a second transistor including a gate, a drain, and a source, in which the first output signal is inputted to the gate, and the second output signal is configured to be outputted from the drain.

(13)

The photodetection device according to (12), in which the second amplifier circuit further includes a second load transistor coupled to the drain of the second transistor.

(14)

The photodetection device according to any one of (1) to (13), further including an inverter provided for the comparison circuit of each of the plurality of AD converters, and inverting the second output signal, in which
  each of the plurality of clamp circuits is coupled to an input end and an output end of the inverter.

(15)

An electronic apparatus including a photodetection device,
  the photodetection device including
    a plurality of pixels arranged in a matrix, the plurality of pixels each being configured to generate a pixel signal,
    a reference signal generation section configured to generate a reference signal,
    a plurality of AD converters provided for respective pixel columns of the plurality of pixels, and including a comparison circuit, the comparison circuit including
      a first-stage amplifier circuit configured to output a first output signal corresponding to a comparison operation based on the pixel signal and the reference signal, and
      a second-stage amplifier circuit coupled to the first-stage amplifier circuit, and being configured to output a second output signal corresponding to the first output signal outputted from the first-stage amplifier circuit, the plurality of AD converters performing AD conversion on the pixel signal on a basis of the second output signal,
    a plurality of clamp circuits provided for the comparison circuit of each of the plurality of AD converters, and each including a switch that is controlled on and off on a basis of a clamp control signal, the plurality of clamp circuits being configured to selectively clamp a voltage of the second output signal from the second-stage amplifier circuit by turning on the switch, and
    a control signal generator that generates the clamp control signal for each of the plurality of clamp circuits.

This application claims the benefit of Japanese Priority Patent Application JP2020-115934 filed with the Japan Patent Office on Jul. 3, 2020, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof

The invention claimed is:

1. A photodetection device, comprising:
a plurality of pixels in a matrix, wherein each of the plurality of pixels is configured to generate a pixel signal;
a reference signal generation section configured to generate a first reference signal;
a plurality of analog to digital (AD) converters associated with respective pixel columns of the plurality of pixels, wherein
the plurality of AD converters includes a comparison circuit,
the comparison circuit is configured to compare the pixel signal with the first reference signal,
the comparison circuit includes:
a first-stage amplifier circuit configured to output a first output signal based on the comparison operation, and
a second-stage amplifier circuit configured to output a second output signal based on the first output signal,
the second-stage amplifier circuit is coupled to the first-stage amplifier circuit, and
the plurality of AD converters is configured to perform AD conversion on the pixel signal based on the second output signal;
a plurality of clamp circuits associated with the comparison circuit, wherein each of the plurality of clamp circuits includes a switch; and
a control signal generator configured to:
generate a clamp control signal for each of the plurality of clamp circuits; and
control a state of the switch of each of the plurality of clamp circuits based on the generated clamp control signal, wherein
the state of the switch corresponds to one of an on state or an off state, and
each of the plurality of clamp circuits is configured to selectively clamp a voltage of the second output signal based on the on state of the switch.

2. The photodetection device according to claim 1, further comprising a power supply circuit associated with the comparison circuit, wherein
the power supply circuit is configured to supply a power supply voltage to the first-stage amplifier circuit and the second-stage amplifier circuit.

3. The photodetection device according to claim 1, wherein
the control signal generator is further configured to generate the clamp control signal based on an AD conversion gain, and
the AD conversion gain is associated with each of the plurality of AD converters.

4. The photodetection device according to claim 3, wherein
each of the plurality of AD converters is operable in a plurality of gain modes,
the plurality of gain modes includes at least a first gain mode and a second gain mode,
in the first gain mode, the plurality of AD converters is further configured to perform the AD conversion at a first AD conversion gain,
in the second gain mode, the plurality of AD converters is further configured to perform the AD conversion at a second AD conversion gain,
the second AD conversion gain is higher than the first AD conversion gain, and
the control signal generator is further configured to:
output, to each of the plurality of clamp circuits, the clamp control signal;
disable a clamping function of each of the plurality of the clamp circuits in the first gain mode based on the clamp control signal; and
enable the clamping function of each of the plurality of the clamp circuits in the second gain mode based on the clamp control signal.

5. The photodetection device according to claim 1, wherein
each of the plurality of pixels is further configured to output:
a signal with a reset voltage in a first period, and
a signal with a pixel voltage corresponding to an amount of received light in a second period,
the reference signal generation section is further configured to generate a second reference signal in a first specific period and a second specific period,
the first specific period is a period before the first period,
the second specific period is a period before the second period,
the second reference signal has a specific reference voltage, and
the control signal generator is further configured to:
generate the clamp control signal; and
turn on the switch based on the clamp control signal at completion of the first specific period and the second specific period.

6. The photodetection device according to claim 1, wherein the first-stage amplifier circuit includes:
a first capacitor configured to receive the first reference signal,
a second capacitor configured to receive the pixel signal, and
a first transistor including a gate, a drain, and a source, wherein
the first capacitor is configured to input the first reference signal to the gate, and
the second capacitor is configured to input the pixel signal to the gate.

7. The photodetection device according to claim 6, wherein
the first-stage amplifier circuit further includes a first load transistor, and
the first load transistor is coupled to the drain of the first transistor.

8. The photodetection device according to claim 6, wherein
at least one of the first capacitor or the second capacitor has a variable capacitance, and
a capacitance ratio between the first capacitor and the second capacitor is changeable.

9. The photodetection device according to claim 8, further comprising a setting control section configured to control the capacitance ratio based on illuminance data.

10. The photodetection device according to claim 9, further comprising a signal processing section configured to:
  generate the illuminance data based on the second output signal; and
  generate image data based on the second output signal, wherein the generation of the image data is after the generation of the illuminance data.

11. The photodetection device according to claim 9, further comprising a setting storage section configured to:
  store setting data; and
  set the capacitance ratio between the first capacitor and the second capacitor based on the setting data, wherein the setting control section is further configured to:
    generate a control signal based on the illuminance data and the setting data; and
    control the capacitance ratio based on the generated control signal.

12. The photodetection device according to claim 1, wherein
  the second-stage amplifier circuit includes a second transistor,
  the second transistor includes a gate, a drain, and a source,
  the gate is configured to receive the first output signal, and
  the drain is configured to output the second output signal to the plurality of clamp circuits.

13. The photodetection device according to claim 12, wherein
  the second-stage amplifier circuit further includes a second load transistor, and
  the second load transistor is coupled to the drain of the second transistor.

14. The photodetection device according to claim 1, further comprising an inverter configured to invert the second output signal, wherein
  the inverter includes an input end and an output end,
  the inverter is associated with the comparison circuit, and
  each of the plurality of clamp circuits is coupled to the input end and the output end of the inverter.

15. An electronic apparatus, comprising
a photodetection device including:
  a plurality of pixels in a matrix, wherein each of the plurality of pixels is configured to generate a pixel signal,
a reference signal generation section configured to generate a reference signal,
a plurality of analog to digital (AD) converters associated with respective pixel columns of the plurality of pixels, wherein
  the plurality of AD converters includes a comparison circuit,
  the comparison circuit is configured to compare the pixel signal with the reference signal,
  the comparison circuit includes:
    a first-stage amplifier circuit configured to output a first output signal based on the comparison, and
    a second-stage amplifier circuit configured to output a second output signal based on the first output signal, wherein the second-stage amplifier circuit is coupled to the first-stage amplifier circuit, and
  the plurality of AD converters is configured to perform AD conversion on the pixel signal based on the second output signal;
a plurality of clamp circuits associated with the comparison circuit, wherein each of the plurality of clamp circuits includes a switch; and
a control signal generator configured to:
  generate a clamp control signal for each of the plurality of clamp circuits; and
  control a state of the switch of each of the plurality of clamp circuits based on the generated clamp control signal, wherein
    the state of the switch includes one of an on state or an off state, and
    each of the plurality of clamp circuits is configured to selectively clamp a voltage of the second output signal based on the on state of the switch.

\* \* \* \* \*